(12) United States Patent
Cok et al.

(10) Patent No.: US 10,091,446 B2
(45) Date of Patent: Oct. 2, 2018

(54) ACTIVE-MATRIX DISPLAYS WITH COMMON PIXEL CONTROL

(71) Applicant: X-Celeprint Limited, Cork (IE)

(72) Inventors: Ronald S. Cok, Rochester, NY (US); Christopher Andrew Bower, Raleigh, NC (US)

(73) Assignee: X-Celeprint Limited, Cork (IE)

( * ) Notice: Subject to any disclaimer, the term of this patent is extended or adjusted under 35 U.S.C. 154(b) by 0 days.

(21) Appl. No.: 15/906,819

(22) Filed: Feb. 27, 2018

(65) Prior Publication Data

US 2018/0191978 A1 Jul. 5, 2018

Related U.S. Application Data

(63) Continuation-in-part of application No. 15/864,851, filed on Jan. 8, 2018, which is a continuation of
(Continued)

(51) Int. Cl.
| | |
|---|---|
| *H04N 5/376* | (2011.01) |
| *G09G 3/3208* | (2016.01) |
| *G09G 3/36* | (2006.01) |
| *G09G 3/20* | (2006.01) |
| *G09G 3/32* | (2016.01) |

(52) U.S. Cl.
CPC .............. *H04N 5/376* (2013.01); *G09G 3/20* (2013.01); *G09G 3/3208* (2013.01); *G09G 3/3611* (2013.01); *G09G 3/32* (2013.01); *G09G 2300/0426* (2013.01);
(Continued)

(58) Field of Classification Search
CPC .... H04N 5/376; G09G 3/3611; G09G 3/3208; G09G 2310/0221; G09G 2310/0286
See application file for complete search history.

(56) References Cited

U.S. PATENT DOCUMENTS

| | | |
|---|---|---|
| 5,550,066 A | 8/1996 | Tang et al. |
| 5,621,555 A | 4/1997 | Park |

(Continued)

FOREIGN PATENT DOCUMENTS

| | | |
|---|---|---|
| GB | 2 496 183 A | 5/2013 |
| WO | WO-2006/027730 A1 | 3/2006 |

(Continued)

OTHER PUBLICATIONS

Cok, R. S. et al., AMOLED displays with transfer-printed integrated circuits, Journal of SID 19/(4):335-341(2011).
(Continued)

*Primary Examiner* — Hung H Lam
(74) *Attorney, Agent, or Firm* — William R. Haulbrook; Michael D. Schmitt; Choate, Hall & Stewart, LLP

(57) ABSTRACT

An exemplary active-matrix system comprises a system substrate with pixel elements disposed in pixel rows and pixel columns, pixel circuits each controlling two or more of the pixel elements, and row and column lines, at least one of each of which is electrically connected to each pixel circuit. The number of row lines is less than the number of pixel rows, the number of column lines is less than the number of pixel columns, or the number of row lines is less than the number of pixel rows and the number of column lines is less than the number of pixel columns.

21 Claims, 17 Drawing Sheets

US 10,091,446 B2

Page 2

Related U.S. Application Data application No. 15/003,721, filed on Jan. 21, 2016, now Pat. No. 9,930,277.

(60) Provisional application No. 62/387,259, filed on Dec. 23, 2015.

(52) U.S. Cl.
CPC ............... *G09G 2310/0221* (2013.01); *G09G 2310/0267* (2013.01); *G09G 2310/0286* (2013.01)

(56) References Cited

U.S. PATENT DOCUMENTS

| | | | |
|---|---|---|---|
| 5,731,802 | A | 3/1998 | Aras et al. |
| 5,815,303 | A | 9/1998 | Berlin |
| 5,912,712 | A | 6/1999 | Doherty |
| 5,994,722 | A | 11/1999 | Averbeck et al. |
| 6,084,579 | A | 7/2000 | Hirano |
| 6,184,477 | B1 | 2/2001 | Tanahashi |
| 6,278,242 | B1 | 8/2001 | Cok et al. |
| 6,392,340 | B2 | 5/2002 | Yoneda et al. |
| 6,448,718 | B1 | 9/2002 | Battersby |
| 6,466,281 | B1 | 10/2002 | Huang et al. |
| 6,577,367 | B2 | 6/2003 | Kim |
| 6,660,457 | B1 | 12/2003 | Imai et al. |
| 6,717,560 | B2 | 4/2004 | Cok et al. |
| 6,756,576 | B1 | 6/2004 | McElroy et al. |
| 6,812,637 | B2 | 11/2004 | Cok et al. |
| 6,933,532 | B2 | 8/2005 | Arnold et al. |
| 7,012,382 | B2 | 3/2006 | Cheang et al. |
| 7,091,523 | B2 | 8/2006 | Cok et al. |
| 7,129,457 | B2 | 10/2006 | McElroy et al. |
| 7,195,733 | B2 | 3/2007 | Rogers et al. |
| 7,288,753 | B2 | 10/2007 | Cok |
| 7,402,951 | B2 | 7/2008 | Cok |
| 7,420,221 | B2 | 9/2008 | Nagai |
| 7,443,438 | B2 * | 10/2008 | Kakumoto ............ H04N 5/235 348/308 |
| 7,466,075 | B2 | 12/2008 | Cok et al. |
| 7,521,292 | B2 | 4/2009 | Rogers et al. |
| 7,557,367 | B2 | 7/2009 | Rogers et al. |
| 7,586,497 | B2 | 9/2009 | Boroson et al. |
| 7,622,367 | B1 | 11/2009 | Nuzzo et al. |
| 7,662,545 | B2 | 2/2010 | Nuzzo et al. |
| 7,687,812 | B2 | 3/2010 | Louwsma et al. |
| 7,704,684 | B2 | 4/2010 | Rogers et al. |
| 7,738,001 | B2 | 6/2010 | Routley et al. |
| 7,791,271 | B2 | 9/2010 | Cok et al. |
| 7,799,699 | B2 | 9/2010 | Nuzzo et al. |
| 7,816,856 | B2 | 10/2010 | Cok et al. |
| 7,834,541 | B2 | 11/2010 | Cok |
| 7,893,612 | B2 | 2/2011 | Cok |
| 7,919,342 | B2 | 4/2011 | Cok |
| 7,927,976 | B2 | 4/2011 | Menard |
| 7,932,123 | B2 | 4/2011 | Rogers et al. |
| 7,943,491 | B2 | 5/2011 | Nuzzo et al. |
| 7,969,085 | B2 | 6/2011 | Cok |
| 7,972,875 | B2 | 7/2011 | Rogers et al. |
| 7,982,296 | B2 | 7/2011 | Nuzzo et al. |
| 7,990,058 | B2 | 8/2011 | Cok et al. |
| 7,999,454 | B2 | 8/2011 | Winters et al. |
| 8,029,139 | B2 | 10/2011 | Ellinger et al. |
| 8,039,847 | B2 | 10/2011 | Nuzzo et al. |
| 8,198,621 | B2 | 6/2012 | Rogers et al. |
| 8,207,547 | B2 | 6/2012 | Lin |
| 8,207,635 | B2 | 6/2012 | Covaro |
| 8,243,027 | B2 | 8/2012 | Hotelling et al. |
| 8,261,660 | B2 | 9/2012 | Menard |
| 8,334,545 | B2 | 12/2012 | Levermore et al. |
| 8,394,706 | B2 | 3/2013 | Nuzzo et al. |
| 8,421,791 | B2 | 4/2013 | Harada |
| 8,440,546 | B2 | 5/2013 | Nuzzo et al. |
| 8,450,927 | B2 | 5/2013 | Lenk et al. |
| 8,470,701 | B2 | 6/2013 | Rogers et al. |
| 8,502,192 | B2 | 8/2013 | Kwak et al. |
| 8,506,867 | B2 | 8/2013 | Menard |
| 8,664,699 | B2 | 3/2014 | Nuzzo et al. |
| 8,686,447 | B2 | 4/2014 | Tomoda et al. |
| 8,722,458 | B2 | 5/2014 | Rogers et al. |
| 8,754,396 | B2 | 6/2014 | Rogers et al. |
| 8,766,970 | B2 | 7/2014 | Chien et al. |
| 8,791,474 | B1 | 7/2014 | Bibl et al. |
| 8,794,501 | B2 | 8/2014 | Bibl et al. |
| 8,803,857 | B2 | 8/2014 | Cok |
| 8,817,369 | B2 | 8/2014 | Daiku |
| 8,854,294 | B2 | 10/2014 | Sakariya |
| 8,877,648 | B2 | 11/2014 | Bower et al. |
| 8,889,485 | B2 | 11/2014 | Bower |
| 8,895,406 | B2 | 11/2014 | Rogers et al. |
| 8,987,765 | B2 | 3/2015 | Bibl et al. |
| 9,153,171 | B2 | 10/2015 | Sakariya et al. |
| 9,202,996 | B2 | 12/2015 | Orsley et al. |
| 9,520,537 | B2 | 12/2016 | Bower et al. |
| 9,626,908 | B2 | 4/2017 | Sakariya et al. |
| 9,640,108 | B2 | 5/2017 | Cok et al. |
| 9,786,646 | B2 * | 10/2017 | Cok .................... H01L 27/0207 |
| 9,818,725 | B2 * | 11/2017 | Bower ................ H01L 25/0655 |
| 9,923,133 | B2 * | 3/2018 | Bower .................... H01L 33/62 |
| 9,928,771 | B2 * | 3/2018 | Cok ...................... G09G 3/2014 |
| 9,930,277 | B2 | 3/2018 | Cok |
| 2001/0022564 | A1 | 9/2001 | Youngquist et al. |
| 2002/0096994 | A1 | 7/2002 | Iwafuchi et al. |
| 2003/0062545 | A1 | 4/2003 | Yamazaki et al. |
| 2003/0189829 | A1 | 10/2003 | Shimizu et al. |
| 2003/0223275 | A1 | 12/2003 | Abe |
| 2004/0212296 | A1 | 10/2004 | Nakamura et al. |
| 2004/0227704 | A1 | 11/2004 | Wang et al. |
| 2004/0252933 | A1 | 12/2004 | Sylvester et al. |
| 2005/0012076 | A1 | 1/2005 | Morioka |
| 2005/0116621 | A1 | 6/2005 | Bellmann et al. |
| 2005/0140275 | A1 | 6/2005 | Park |
| 2005/0168987 | A1 | 8/2005 | Tamaoki et al. |
| 2005/0275615 | A1 | 12/2005 | Kahen et al. |
| 2006/0063309 | A1 | 3/2006 | Sugiyama et al. |
| 2007/0035340 | A1 | 2/2007 | Kimura |
| 2007/0077349 | A1 | 4/2007 | Newman et al. |
| 2007/0201056 | A1 | 8/2007 | Cok et al. |
| 2008/0180381 | A1 | 7/2008 | Jeong et al. |
| 2008/0259019 | A1 | 10/2008 | Ng |
| 2009/0147033 | A1 | 6/2009 | Arai et al. |
| 2009/0273303 | A1 | 11/2009 | Peng |
| 2009/0315054 | A1 | 12/2009 | Kim et al. |
| 2010/0045690 | A1 | 2/2010 | Handschy et al. |
| 2010/0078670 | A1 | 4/2010 | Kim et al. |
| 2010/0085295 | A1 | 4/2010 | Zhao et al. |
| 2010/0123268 | A1 | 5/2010 | Menard |
| 2010/0214247 | A1 | 8/2010 | Tang et al. |
| 2010/0248484 | A1 | 9/2010 | Bower et al. |
| 2010/0258710 | A1 | 10/2010 | Wiese et al. |
| 2010/0317132 | A1 | 12/2010 | Rogers et al. |
| 2011/0084993 | A1 | 4/2011 | Kawabe |
| 2011/0199011 | A1 | 8/2011 | Nakazawa |
| 2011/0211348 | A1 | 9/2011 | Kim |
| 2012/0126229 | A1 | 5/2012 | Bower |
| 2012/0206499 | A1 * | 8/2012 | Cok .................... G09G 3/3208 345/690 |
| 2012/0228669 | A1 | 9/2012 | Bower et al. |
| 2012/0314388 | A1 | 12/2012 | Bower et al. |
| 2013/0015483 | A1 | 1/2013 | Shimokawa et al. |
| 2013/0069275 | A1 | 3/2013 | Menard et al. |
| 2013/0088416 | A1 | 4/2013 | Smith et al. |
| 2013/0141469 | A1 | 6/2013 | Xu |
| 2013/0153277 | A1 | 6/2013 | Menard et al. |
| 2013/0196474 | A1 | 8/2013 | Meitl et al. |
| 2013/0207964 | A1 | 8/2013 | Fleck et al. |
| 2013/0221355 | A1 | 8/2013 | Bower et al. |
| 2013/0273695 | A1 | 10/2013 | Menard et al. |
| 2014/0055654 | A1 | 2/2014 | Borthakur et al. |
| 2014/0104243 | A1 | 4/2014 | Sakariya et al. |
| 2014/0184667 | A1 | 7/2014 | Xu |
| 2014/0217448 | A1 | 8/2014 | Kim et al. |
| 2014/0264763 | A1 | 9/2014 | Meitl et al. |

(56) References Cited

U.S. PATENT DOCUMENTS

| | | |
|---|---|---|
| 2014/0267683 A1 | 9/2014 | Bibl et al. |
| 2014/0306248 A1 | 10/2014 | Ahn et al. |
| 2014/0367633 A1 | 12/2014 | Bibl et al. |
| 2014/0367705 A1 | 12/2014 | Bibl et al. |
| 2015/0135525 A1 | 5/2015 | Bower |
| 2015/0137153 A1 | 5/2015 | Bibl et al. |
| 2015/0169011 A1 | 6/2015 | Bibl et al. |
| 2015/0181148 A1 | 6/2015 | Slovick et al. |
| 2015/0263066 A1 | 9/2015 | Hu et al. |
| 2015/0280066 A1 | 10/2015 | Fujimura et al. |
| 2015/0280089 A1 | 10/2015 | Obata et al. |
| 2015/0302795 A1 | 10/2015 | Genoe |
| 2015/0371585 A1 | 12/2015 | Bower et al. |
| 2015/0371591 A1 | 12/2015 | Suzuki et al. |
| 2015/0371974 A1 | 12/2015 | Bower et al. |
| 2015/0372051 A1 | 12/2015 | Bower et al. |
| 2015/0372052 A1 | 12/2015 | Bower et al. |
| 2015/0372053 A1 | 12/2015 | Bower et al. |
| 2015/0373793 A1 | 12/2015 | Bower et al. |
| 2016/0005721 A1 | 1/2016 | Bower et al. |
| 2016/0018094 A1 | 1/2016 | Bower et al. |
| 2016/0064363 A1 | 3/2016 | Bower et al. |
| 2016/0093600 A1 | 3/2016 | Bower et al. |
| 2016/0118026 A1 | 4/2016 | Loo et al. |
| 2016/0119565 A1 | 4/2016 | Fujita et al. |
| 2016/0127668 A1 | 5/2016 | Fujita et al. |
| 2016/0163253 A1 | 6/2016 | Chaji et al. |
| 2016/0212361 A1 | 7/2016 | Suzuki |
| 2016/0343771 A1 | 11/2016 | Bower et al. |
| 2017/0040371 A1 | 2/2017 | Izuhara |
| 2017/0047393 A1 | 2/2017 | Bower et al. |
| 2017/0061867 A1 | 3/2017 | Cok et al. |
| 2017/0154819 A1 | 6/2017 | Bower et al. |
| 2017/0186356 A1 | 6/2017 | Cok |
| 2017/0187976 A1 | 6/2017 | Cok |
| 2017/0188427 A1 | 6/2017 | Cok et al. |
| 2017/0206820 A1 | 7/2017 | Cok et al. |
| 2017/0206845 A1 | 7/2017 | Sakariya et al. |
| 2017/0330509 A1 | 11/2017 | Cok et al. |
| 2017/0352647 A1 | 12/2017 | Raymond et al. |
| 2018/0131886 A1 | 5/2018 | Cok |

FOREIGN PATENT DOCUMENTS

| | | |
|---|---|---|
| WO | WO-2006/099741 A1 | 9/2006 |
| WO | WO-2008/103931 A2 | 8/2008 |
| WO | WO-2010/032603 A1 | 3/2010 |
| WO | WO-2010/111601 A2 | 9/2010 |
| WO | WO-2010/132552 A1 | 11/2010 |
| WO | WO-2013/064800 A1 | 5/2013 |
| WO | WO-2013/165124 A1 | 11/2013 |
| WO | WO-2014/121635 A1 | 8/2014 |
| WO | WO-2014/149864 A1 | 9/2014 |

OTHER PUBLICATIONS

Hamer et al., 63.2: AMOLED Displays Using Transfer-Printed Integrated Circuits, SID 09 Digest, 40(2):947-950 (2009).

Lee, S. H. etal, Laser Lift-Offof GaN Thin Film and its Application to the Flexible Light Emitting Diodes, Proc. of SPIE 8460:846011-1-846011-6 (2012).

Roscher, H., VCSEL Arrays with Redundant Pixel Designs for 10Gbits/s 2-D Space-Parallel MMF Transmission, Annual Report, optoelectronics Department, (2005).

Yaniv et al., a 640 x 480 Pixel Computer Display Using Pin Diodes with Device Redundancy, 1988 International Display Research Conference, IEEE, Ch-2678-1/88:152-154 (1988).

Cok, R. S. et al., Inorganic light-emitting diode displays using micro-transfer printing, Journal of the SID, 25(10):589-609, (2017).

* cited by examiner

ACTIVE-MATRIX DISPLAYS WITH COMMON PIXEL CONTROL

RELATED APPLICATIONS

This application is a continuation-in-part of U.S. patent application Ser. No. 15/864,851, filed Jan. 8, 2018, titled Serial Row-Select Matrix-Addressed System, which is a continuation of U.S. patent application Ser. No. 15/003,721, filed Jan. 21, 2016, titled Serial Row-Select Matrix-Addressed System, which claims the benefit of U.S. Provisional Patent Application No. 62/387,259, filed Dec. 23, 2015, titled Serial Row-Select Matrix-Addressed System, by Cok, the contents of each of which are incorporated by reference herein in their entirety.

This application is related to commonly assigned U.S. patent application Ser. No. 14/835,282 filed Aug. 25, 2015, entitled Bit-Plane Pulse Width Modulated Digital Display System, by Cok et al. and to commonly assigned U.S. patent application Ser. No. 14/807,226 filed Jul. 23, 2015, entitled Parallel Redundant Chiplet System, by Cok et al., which are hereby incorporated by reference in their entirety.

FIELD OF THE INVENTION

The present invention relates to matrix-addressed systems such as flat-panel displays or area sensors. In particular, the present invention relates to control methods, devices, and circuits for matrix-addressing a pixel array.

BACKGROUND OF THE INVENTION

Flat-panel displays are widely used in conjunction with computing devices, in portable devices, and for entertainment devices such as televisions. Such displays typically employ an array of pixels distributed in rows and columns over a display substrate to display images, graphics, or text. In a color display, each pixel includes light emitters that emit light of different colors, such as red, green, and blue. For example, liquid crystal displays (LCDs) employ liquid crystals to block or transmit light from a backlight behind the liquid crystals and organic light-emitting diode (OLED) displays rely on passing current through a layer of organic material that glows in response to the current. Displays using inorganic light emitting diodes (LEDs) are also in widespread use for outdoor signage and have been demonstrated in a 55-inch television. Flat-panel electronic sensors having a plurality of pixel sensors are also available; for example, for digital radiography.

Flat-panel displays and other matrix-addressed systems such as imaging systems are typically controlled with either a passive-matrix (PM) control employing electronic circuitry external to the display substrate or an active-matrix (AM) control employing electronic circuitry formed directly on the display substrate and associated with each light-emitting element. Both OLED displays and LCDs using passive-matrix control and active-matrix control are available. An example of such an AM OLED display device is disclosed in U.S. Pat. No. 5,550,066.

Active-matrix systems are often found in large-format displays, such as liquid-crystal displays (LCDs) or organic light-emitting diode (OLED) displays. Such active-matrix displays typically comprise an array of pixel circuits (e.g., pixel controllers, micro-controllers) arranged in rows and columns on a display substrate in a display area. Each pixel circuit controls a light-controlling element. Each light-controlling element can be a single controllable light absorber, light reflector, or light emitter. A row-select line is electrically connected to each row of pixel circuits and a column-data line is electrically connected to each column of pixel circuits in the array of pixel circuits. Each row of pixel circuits is sequentially selected by the corresponding row-select line and data is provided to each pixel circuit in the row through the column-data line connected to the pixel circuit.

In these systems, each pixel circuit is electrically connected and responsive to a unique pair of a row-select and a column-data line that provides data corresponding to a desired luminance of the light-controlling elements in a selected row, stores the data in a pixel-control circuit, and controls a light-controlling element with the pixel circuit according to the stored data. In contrast, a passive-matrix system does not have a pixel circuit that stores data associated with each light-controlling element.

A paper entitled "AMOLED Displays with Transfer-Printed Integrated Circuits" (Cok et al, Journal of the Society for Information Display Digest, p. 335, 2011, 1071-0922/11/1904-0335, DOI #10.1889/JSID19.4.335), illustrates an OLED display with pixel controllers controlling a four-color pixel (red, green, blue, white) in response to analog signals provided on row-select and column-data lines. In this design, a single micro-transfer printed integrated circuit controls each four-color pixel and is responsive to two row-select and two column-data lines. In other designs, for example as illustrated in U.S. Pat. No. 8,599,118 and in U.S. Pat. No. 8,896,505, a single integrated circuit controls multiple multi-color LED pixels. An array of these integrated circuits and multi-color pixels form a light-emitting assembly such as a display comprising an array of light-emitting diode (LED) devices and an array of micro-controllers to switch and drive the array of LED devices, where the number of micro-controllers in the array of micro-controllers is less than the number of LED devices in the array of LED devices. Each micro-controller is electrically connected to a plurality of the multi-color pixels so that each micro-controller drives a plurality of multi-color pixels, each multi-color pixel comprising a plurality of LEDs, where each LED of the plurality of LEDs in a multi-color pixel emits light of a different color.

Active-matrix circuits are commonly constructed with thin-film transistors (TFTs) in a semiconductor layer formed over a display substrate and employing a separate TFT circuit to control each light-emitting pixel in the display. The semiconductor layer is typically amorphous silicon or polycrystalline silicon and is distributed over the entire flat-panel display substrate. The semiconductor layer is photolithographically processed to form electronic control elements, such as transistors and capacitors. Additional layers, for example, insulating dielectric layers and conductive metal layers are provided, often by evaporation or sputtering, and photolithographically patterned to form electrical interconnections, or wires. For example, U.S. Pat. No. 8,421,791 discloses a matrix-addressed liquid crystal display and U.S. Pat. No. 6,448,718 discloses an active-matrix-addressed electro-luminescent display.

Typically, each display sub-pixel is controlled by one control element, and each control element includes at least one transistor. For example, in a simple active-matrix organic light-emitting diode (OLED) display, each control element includes two transistors (a select transistor and a power transistor) and one capacitor for storing a charge specifying the luminance of the sub-pixel. Each OLED element employs an independent control electrode connected to the power transistor and a common electrode. In contrast, an LCD typically uses a single transistor to control each pixel. Control of the light-emitting elements is usually provided through a data signal line, a select signal line, a power connection and a ground connection. Active-matrix elements are not necessarily limited to displays and can be distributed over a substrate and employed in other applications requiring spatially distributed control.

Inorganic light-emitting diode displays using inorganic micro-LEDs on a display substrate are also known. Micro-LEDs can have an area less than 1 mm square, less than 100 microns square, or less than 50 microns square or have an area small enough that it is not visible to an unaided observer of the display at a designed viewing distance. U.S. Pat. No. 8,722,458 entitled Optical Systems Fabricated by Printing-Based Assembly teaches transferring light-emitting, light-sensing, or light-collecting semiconductor elements from a wafer substrate to a destination substrate.

Active-matrix display control is typically provided by a display controller that in turn controls a column controller and a row controller. The column controller includes a column drive circuit for each column of pixels. Each column drive circuit is electrically connected to each pixel circuit in the column corresponding to the column drive circuit. Similarly, the row controller includes a circuit for selecting each row of pixels. Each row-selection circuit is electrically connected to each pixel circuit in the row corresponding to the row-selection circuit. In operation, the column controller supplies a data value to each column and the row controller energizes the row-selection circuit corresponding to the row of pixels for which the data values are intended. This arrangement, however, requires a separate electrical connection for each column and for each row. Thus, for an M×N pixel array, M+N electrical connections must be made to the array of pixels and generally to the substrate on which the flat-panel display is provided. For large displays, for example, having thousands of rows and columns of pixels, the cost of connecting the pixel rows and columns can be significant.

There is a need therefore for matrix-addressed system architectures that reduce the cost of controlling a display and the number and cost of electrical connections in a matrix-addressed system such as a flat-panel display or imaging system.

SUMMARY OF THE INVENTION

The present invention includes a matrix-addressed system having a system substrate and an array of pixels arranged in rows and columns disposed on the system substrate. A column-control circuit provides information to or receives information from the pixels. The column-control circuit includes a separate column-driver circuit connected to each column of pixels that provides information in common to all of the pixels in the column or receives information in common from all of the pixels in the column. A row-select circuit disposed on the system substrate includes a serial shift register having a number of row storage elements equal to or larger than the number of rows in the array of pixels. Each row storage element in the shift register has a row line (e.g., row-select line) connected to all of the pixels in a row.

Prior-art matrix addressed systems include row controllers that are not disposed on the substrate and therefore require a large number of interconnections to the substrate (at least as large as the number of rows and columns in the matrix-addressed system). By employing the row-select circuit of the present invention, the number of interconnections to the substrate can be reduced to the number of columns plus one. Furthermore, prior-art row-controller designs require large, relatively complex integrated circuits that can require significant power. In contrast, the present invention can employ an array of very small (a few microns) chiplets or bare integrated circuit dies that reduce the area and power needed to provide row control in the matrix-addressed system. Thus, while prior-art row-controller designs are generally too large to be included on a display or sensor substrate because the perimeter of the display or sensor substrate would be unacceptably large, embodiments of the present invention use microscopic chiplets that have little impact on the perimeter of the display or sensor and therefore, provide a higher level of integration and fewer interconnections.

Embodiments of the present invention provide matrix-addressed arrays of transducers, for example light emitters, heat emitters, piezo devices, field generators, light sensors, touch sensors, capacitive sensors, mechanical sensors, or any other device that outputs energy or senses energy or environmental attributes.

Embodiments of the present invention provide passive-matrix or active-matrix control of the matrix-addressed array or pixels. Pixels included in the present invention include one-or-more pixel storage devices, such as capacitors or flip flops. In an embodiment, the pixel storage devices store red, green, and blue information in a full-color pixel.

Pixels of the present invention can include pixel circuits that are formed in pixel substrates, for example, bare die or unpackaged integrated circuit substrate that are separate and distinct from the system substrate. The present invention can also include light elements formed in or on light element substrates, for example bare die or unpackaged integrated circuit substrate that are separate and distinct from the system substrate. The row-select circuit can also be formed in or on one or more row-select substrates, for example, bare die or unpackaged integrated circuit substrate that are separate and distinct from the system substrate. The separate and distinct substrates can be micro-transfer printed onto the system substrate. Alternatively, in an embodiment, the pixel substrates and the light element substrates are micro-transfer printed onto a pixel module substrates that are separate and distinct from the system substrate, the light element substrates, the pixel substrates, and the row-select substrates. The pixel module substrates can be disposed on the system substrate, for example by pick-and-place methods or micro-transfer methods. By employing micro-transfer printing methods, larger substrates with higher performance are provided in an efficient manufacturing process.

In another embodiment, redundant circuit elements, for example, redundant row storage elements, are provided to increase the robustness of the matrix-addressed system.

In an embodiment, the light elements are micro-light-emitting diodes (micro-LEDs) or photo-sensors that each has a width from 2 to 5 µm, 5 to 10 µm, 10 to 20 µm, or 20 to 50 µm, each has a length from 2 to 5 µm, 5 to 10 µm, 10 to 20 µm, or 20 to 50 µm, or each has a height from 2 to 5 µm, 4 to 10 µm, 10 to 20 µm, or 20 to 50 µm. The pixel substrates or the row-select substrates can each have a length from 2 to 5 µm, 5 to 10 µm, 10 to 20 µm, or 20 to 50 µm, or can each have a height from 2 to 5 µm, 4 to 10 µm, 10 to 20 µm, or 20 to 50 µm.

In one aspect, the present invention is directed to an active-matrix system comprising a system substrate, pixel elements disposed in pixel rows and pixel columns on the system substrate, pixel circuits disposed in circuit rows and circuit columns on the system substrate, each pixel circuit controlling two or more of the pixel elements, and a row line (e.g., row-select line) and a column line (e.g., column-data line) electrically connected to each pixel circuit. The number of row lines is less than the number of pixel rows, the number of column lines is less than the number of pixel columns, or the number of row lines is less than the number of pixel rows and the number of column lines is less than the number of pixel columns. Each pixel element can comprise a broken (e.g., fractured) or separated tether.

In some embodiments, an active-matrix system comprises: a system substrate having an active area; pixel elements disposed on, in, over, or under the system substrate, the pixel elements arranged in the active area in a pixel element array having pixel rows and pixel columns, wherein each pixel element in the pixel element array is in one of the pixel rows and one of the pixel columns; pixel circuits disposed on, in, over, or under the system substrate in the active area in a pixel circuit array having circuit rows and circuit columns, wherein each of the pixel circuits is in one of the circuit rows or one of the circuit columns and is independent of each other of the pixel circuits, each of the pixel circuits is electrically connected to and controls two or more of the pixel elements, and the pixel circuits number less than the pixel elements; row lines (e.g., row-select lines) disposed on, in, over, or under the system substrate in the active area, wherein for each of the row lines, the row line is electrically connected to all of the pixel circuits in one of the circuit rows to provide information in common to all of the pixel circuits in the one circuit row, or receive information in common from all of the pixel circuits in the one circuit row, through the row line; and column lines (e.g., column-data lines) electrically separate from the row lines disposed on, in, over, or under the system substrate in the active area, wherein for each of the column lines, the column line is electrically connected to all of the pixel circuits in one of the circuit columns to provide information in common to all of the pixel circuits in the one circuit column, or receive information in common from all of the pixel circuits in the one circuit column, through the column line. Information can include data or signals, or both data and signals. The row lines number less than the pixel rows, the column lines number less than the pixel columns, or the row lines number less than the pixel rows and the column lines number less than the pixel columns. Each of the pixel circuits comprises a pixel storage element that stores information in response to signals communicated on the row line and the column line to which the pixel circuit is connected.

In some embodiments, the system substrate is a display substrate, the active area is a display area, the pixel elements are one or more of controllable light-reflective pixels, controllable light-absorbing pixels, and controllable light-emitting pixels, and the active-matrix system is an active-matrix display. Each of the pixel elements can comprise an inorganic light-emitting diode. Each inorganic light-emitting diode can comprise a broken (e.g., fractured) or separated tether.

In some embodiments, each of the pixel elements comprises two or more light-controlling elements, each light-controlling element of the two or more light-controlling elements controlling a different color of visible light than each other of the two or more light-controlling elements.

In some embodiments, the active-matrix system comprises a sensor disposed on, in, over, or under the display substrate and electrically connected to one or more of the pixel circuits.

In some embodiments, the system substrate is a sensor substrate, the active area is a sensor area, the pixel elements are light-responsive pixels, and the active-matrix system is an image sensor. Each of the pixel elements can comprise a photo-sensor. Each photo-sensor of the pixel elements can comprise a broken (e.g., fractured) or separated tether.

In some embodiments, the pixel circuits are digital controllers and the pixel storage element of each of the pixel circuits stores digital values corresponding to a value associated with the two or more of the pixel elements controlled by the pixel circuit. The row lines can conduct digital signals, the column lines can conduct digital signals, or both the row lines and the column lines can conduct digital signals. The signals can be data, information, or other signals.

In some embodiments, the pixel circuits are analog controllers and the pixel storage element of each of the pixel circuit stores analog values corresponding to a value associated with the two or more of the pixel elements controlled by the pixel circuit. The row lines can conduct analog signals, the column lines can conduct analog signals, or both the row lines and the column lines can conduct analog signals. The signals can be data, information, or other signals.

In some embodiments, row drivers are electrically connected to each of the row lines, column drivers are electrically connected to each of the column lines, or row drivers are electrically connected to each of the row lines and column drivers are electrically connected to each of the column lines.

In some embodiments of the present invention, two or more of the pixel elements controlled by each pixel circuit are in a common pixel row or are in a common pixel column such that the two or more of the pixel elements form a one-dimensional array of pixel elements. In some embodiments, at least two of the two or more of the pixel elements controlled by each pixel circuit are in different rows and in different columns such that the two or more of the pixel elements form a two-dimensional array of pixel elements. In an embodiment, the row lines conduct pulse-width modulation signals, control signals, and timing signals and the column lines conduct data.

In some embodiments, the active-matrix system comprises pixel substrates disposed on the system substrate. At least one of the pixel circuits and the two or more of the pixel elements controlled by each of the at least one of the pixel circuits is disposed on each pixel substrate. Each of the pixel substrates can comprise a broken or separated tether.

In some embodiments of the present invention, each of the pixel elements can comprise one or more micro-devices that each have at least one of a width from 2 to no more than 5 µm, 5 to no more than 10 µm, 10 to no more than 20 µm, or 20 to no more than 50 µm, a length from 2 to no more than 5 µm, 5 to no more than 10 µm, 10 to no more than 20 µm, or 20 to no more than 50 µm, and a thickness from 2 to no more than 5 µm, 5 to no more than 10 µm, 10 to no more than 20 µm, or 20 to no more than 50 µm.

In some embodiments of the present invention, each of the pixel circuits can comprise one or more micro-devices that each have at least one of a width from 2 to no more than 5 µm, 5 to no more than 10 µm, 10 to no more than 20 µm, or 20 to no more than 50 µm, a length from 2 to no more than 5 µm, 5 to no more than 10 µm, 10 to no more than 20 µm, or 20 to no more than 50 µm, and a thickness from 2 to no more than 5 µm, 5 to no more than 10 µm, 10 to no more than 20 µm, or 20 to no more than 50 µm.

In some embodiments, at least a portion of the pixel circuits are disposed between the pixel elements. In some embodiments, for each of the pixel circuits, the two or more pixel elements are disposed adjacent to at least two sides of the pixel circuit that controls the two or more pixel elements.

Certain embodiments of the present invention reduce the cost of controlling a display and the number and cost of electrical connections in a matrix-addressed system such as a flat-panel display or imaging system by requiring fewer pixel circuits electrically connected to fewer row and column lines. Fewer pixel circuits, row lines, and column lines can also improve the transparency of an active-matrix system, such as a display.

BRIEF DESCRIPTION OF THE DRAWINGS

The foregoing and other objects, aspects, features, and advantages of the present disclosure will become more apparent and better understood by referring to the following description taken in conjunction with the accompanying drawings, in which.

Figure 1:
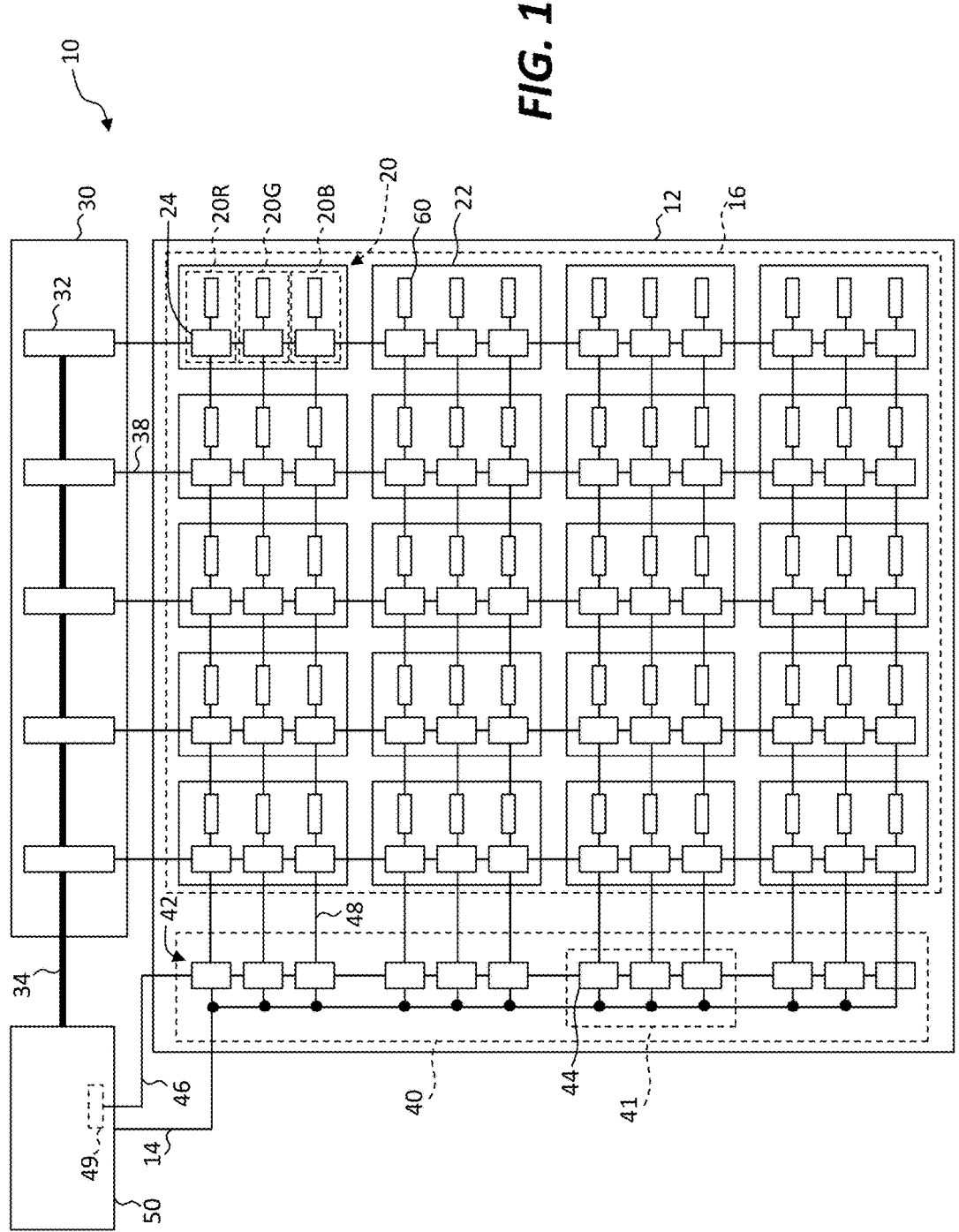
FIG. 1 is a schematic diagram of an embodiment of the present invention.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The figures are not drawn to scale since the variation in size of various elements in the Figures is too great to permit depiction to scale.

DETAILED DESCRIPTION OF THE INVENTION

Referring to the schematic diagram of FIG. 1, a matrix-addressed system 10 of the present invention includes a system substrate 12 having an active area 16. An array of pixels 20 are arranged in rows and columns and disposed on the system substrate 12 in the active area 16. Each pixel 20 includes one or more light elements 60 such as light emitters or light sensors. A column-control circuit 30 provides information to the pixels 20, for example through column lines 38. The column-control circuit 30 includes a separate column-driver circuit 32 connected to each column of pixels 20; for example, through the column lines 38 that provides information in common to all of the pixels 20 in the corresponding column. A row-select circuit 40 is disposed on the system substrate 12. The row-select circuit 40 includes a serial shift register 42 having a number of row storage elements 44 equal to or larger than the number of rows in the array of pixels 20. Each row storage element 44 in the serial shift register 42 has a row line 48 (e.g., a row-select line) connected to all of the pixels 20 in a row. The column-control circuit 30, the row-select circuit 40, and the array of pixels 20 can be responsive to a system controller 50 that provides data and control signals to them. In one embodiment, the matrix-addressed system is a display system including an array of light emitters. In another embodiment, the matrix-addressed system is a sensor system including an array of sensors. In embodiments of the present invention, rows and columns can be interchanged.

The system substrate 12 can be, for example, a display substrate or sensor substrate incorporating glass, metal, polymer, resin, cured resin, or ceramic. The pixels 20 can be light-emitting pixels, for example including micro-light-emitting diodes (micro-LEDs) or sensors responsive to electromagnetic radiation such as visible light, infrared radiation, ultraviolet radiation, or x-rays.

The column-control circuit 30 can be a digital circuit including a serial shift register of flip-flops or digital latches or an analog shift register including capacitors for shifting rows of pixel information into alignment with the pixel columns in the array. The column-control circuit 30 can be an integrated circuit or include other discrete electronic components and includes an array of column-driver circuits 32. Each column-driver circuit 32 is electrically connected to a separate and independent column line 38 that is connected in common to all of the pixels 20 in a corresponding column of pixels 20. The column-driver circuits 32 can include, for example, driving transistors capable of providing an electrical column signal that can communicate data to the column line 38 and to its corresponding column of pixels 20. Thus, the column-driver circuit 32 provides information through its connected column line 38 to the corresponding column of pixels 20. The column lines 38 are electrical conductors such as wires capable of communicating signals from the column-driver circuits 32 to the pixels 20 in the column of pixels 20 associated with the column-driver circuit 32.

The system controller 50 can provide information and control signals to the column-control circuit 30 either serially or in parallel through electrical conductors or a bus, for example as illustrated with data lines 34. The system controller 50 can also provide a control bit (or a token) to the row-select circuit 40 that is shifted serially through the serial shift register 42 of the row-select circuit 40 to select sequential rows of pixels 20, for example with a row-control circuit 49 that can be a part of the system controller 50 (for example a circuit in an integrated circuit) or can be a separate circuit.

The row-select circuit 40 can be a digital circuit including an analog or digital serial shift register 42 including row storage elements 44 such as flip-flops, digital latches, or capacitors for shifting a row select signal into alignment with the rows of pixels 20 in the array. The row-select circuit 40 can be an integrated circuit or include other discrete electronic components and can be responsive to the system controller 50. Each row storage element 44 is electrically connected to a separate and independent row line 48 that is connected in common to all of the pixels 20 in a corresponding row of pixels 20. The row storage elements 44 store a value and can include, for example, capacitors for storing a charge, flip-flops, latches, or digital latches for storing a digital value, and driving transistors capable of providing an electrical row select signal to the row line 48 in response to the stored value in the row storage elements 44. The row lines 48 are electrical conductors such as wires capable of communicating signals from the row-select circuits 40 and row storage elements 44 to the pixels 20 in the row of pixels 20 associated with the row storage elements 44.

A row-control circuit 49 provides a row select signal (for example a charge or a digital value) that is shifted into the serial shift register 42 of the row-select circuit 40 through a select control line 46, such as a wire or other conductors in response to a clock 14; for example, provided by the system controller 50. The row-control circuit 49 can be a part of the system controller 50, for example part of an integrated circuit, or not. Alternatively, the row-control circuit 49 can be an independent integrated circuit or provided in discrete logic.

In an embodiment of the present invention, the light elements 60 are light emitters such as light-emitting diodes (LEDs) or micro-LEDs. In another embodiment, the light elements 60 are light sensors such as photo-sensors sensitive to visible light, infrared light, ultraviolet light, x-rays, or electromagnetic radiation. As used herein, a light sensor is sensitive to visible electromagnetic radiation (i.e., visible light) or non-visible electromagnetic radiation (e.g., infrared light, ultraviolet light, or x-rays). A light sensor is any device that converts incident electromagnetic radiation to an electrical signal (e.g., voltage or current) and is not limited to particular classes of photo-sensors such as photo-diodes.

Matrix-addressed systems 10 of the present invention can be addressed using passive-matrix addressing or active-matrix addressing. In a passive-matrix address scheme, each pixel 20 (e.g., light emitter or light sensor) is directly addressed using the row line 48 and column line 38. When data (information) is written to a row, the row line 48 corresponding to the row selects all of the pixels 20 in the row and each of the column lines 38 provides the data or information (for example an analog voltage or current) to each of the pixels 20 in the row. The next row is then selected and the process repeated for each row. Thus, in a passive-matrix controlled device the light elements 60 are only active when they are part of a selected row. In an analog arrangement, the column-control circuit 30 can include a serially connected analog shift register using charged capacitors to provide the information. In an embodiment of the present invention, the column-control circuit 30 and the row-select circuit 40 provide passive-matrix control to the array of pixels 20.

In an active-matrix address scheme of the present invention, each pixel 20 (e.g., light emitter or light sensor) includes some circuit for information storage. The information is provided by the column line 38 to each pixel 20 in a row that is selected by the row line 48 under the control of the row-select circuit 40. When data (information) is written to a row, the row line 48 corresponding to the row selects all of the pixels 20 in the row and each of the column lines 38 provides the data or information (for example an analog voltage or current or a digital value) to each of the pixels 20 in the row. Each of the pixels 20 then stores the analog voltage, current, charge, or digital value and uses the stored value to drive the pixel's light element 60 (e.g., a light emitter or light sensor). The next row is then selected and the process repeated for each row. Thus, in an active-matrix controlled device the light elements 60 can be active when they are not selected since the information used to control the light elements 60 is stored and available in the pixel 20 even when the pixel 20 is not selected. In an analog arrangement, the column-control circuit 30 and the row-select circuit 40 can each include a serially connected analog shift register using charged capacitors to provide the information or row-select signals and the pixel 20 can include a storage circuit to store the information, for example in a capacitor. In a digital implementation, the column-control circuit 30 can include a serially connected digital shift register using flip-flops or digital latches to provide the information and the pixel 20 can include a storage circuit (e.g., pixel storage element 26) to store the information, for example in a flip-flop or digital latch. In an embodiment of the present invention, the column-control circuit 30 and the row-select circuit 40 provide active-matrix control to the array of pixels 20.

In embodiments of the present invention, each pixel 20 includes a pixel circuit 24 that is connected to the light elements 60 of the pixel 20, that is connected to the column-driver circuit 32 corresponding to the column in which the pixel 20 is arranged, for example through the column lines 38, and that is connected to the row line 48 corresponding to the row in which the pixel 20 is arranged. The pixel circuit 24 can include a pixel storage element 26 that stores information in response to signals provided by the row line 48 and column-driver circuit 32 to which it is connected by the column line 38. The pixel storage element 26 can include (in an analog embodiment) a capacitor or (in a digital embodiment) a flip-flop or latch such as a digital latch. The pixel storage elements 26 can be the same kind of storage circuit as the row storage elements 44, or they can be different.

Figure 2:
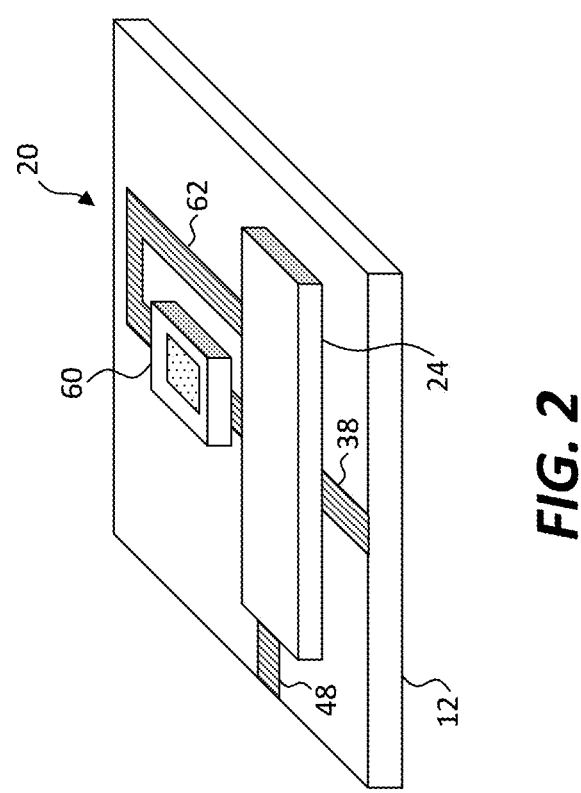
FIG. 2 is a perspective of a pixel structure according to an embodiment of the present invention corresponding to FIG. 1.
Figure 3:
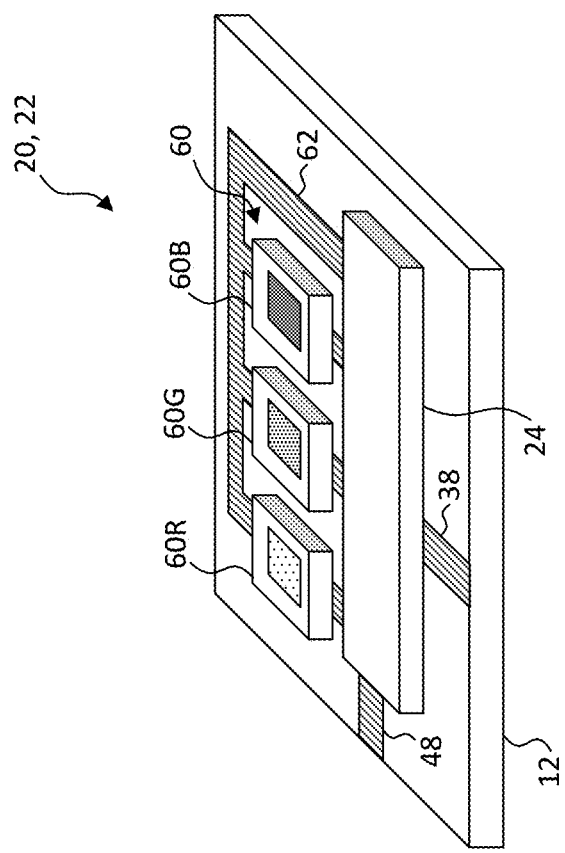
FIG. 3 is a perspective of a pixel structure having multiple light elements according to an embodiment of the present invention.

Referring to FIG. 2, in an embodiment of the present invention, the light elements 60 are light-emitting diodes (LEDS, for example micro-LEDs) that are formed in or on one or more light element substrates that are separate, distinct, and independent of the system substrate 12. Likewise, the pixel circuit 24 can be formed in or on one or more pixel substrates that are separate, distinct, and independent of the system substrate 12. The various separate, distinct, and independent substrates of embodiments of the present invention can be bare die, for example, unpackaged integrated circuit substrates such as semiconductor substrates. FIG. 2 illustrates an embodiment with a single light element 60 controlled by each pixel circuit 24 in each pixel 20. In another embodiment illustrated in FIG. 3, each pixel circuit 24 in each pixel 20 can control a plurality of light elements 60; for example, corresponding to red, green, or blue light elements 60R, 60G, 60B such as red, green, or blue light emitters that emit red, green, or blue light, respectively, or red, green, or blue light sensors that are sensitive to red, green, or blue light, respectively, to form a full-color pixel 20. In FIGS. 2 and 3, the light elements 60 can be electrically connected to the pixel circuit 24 through electrical conductors 62, such as wires formed by photolithography or cured ink deposited by inkjet devices.

Figure 4:
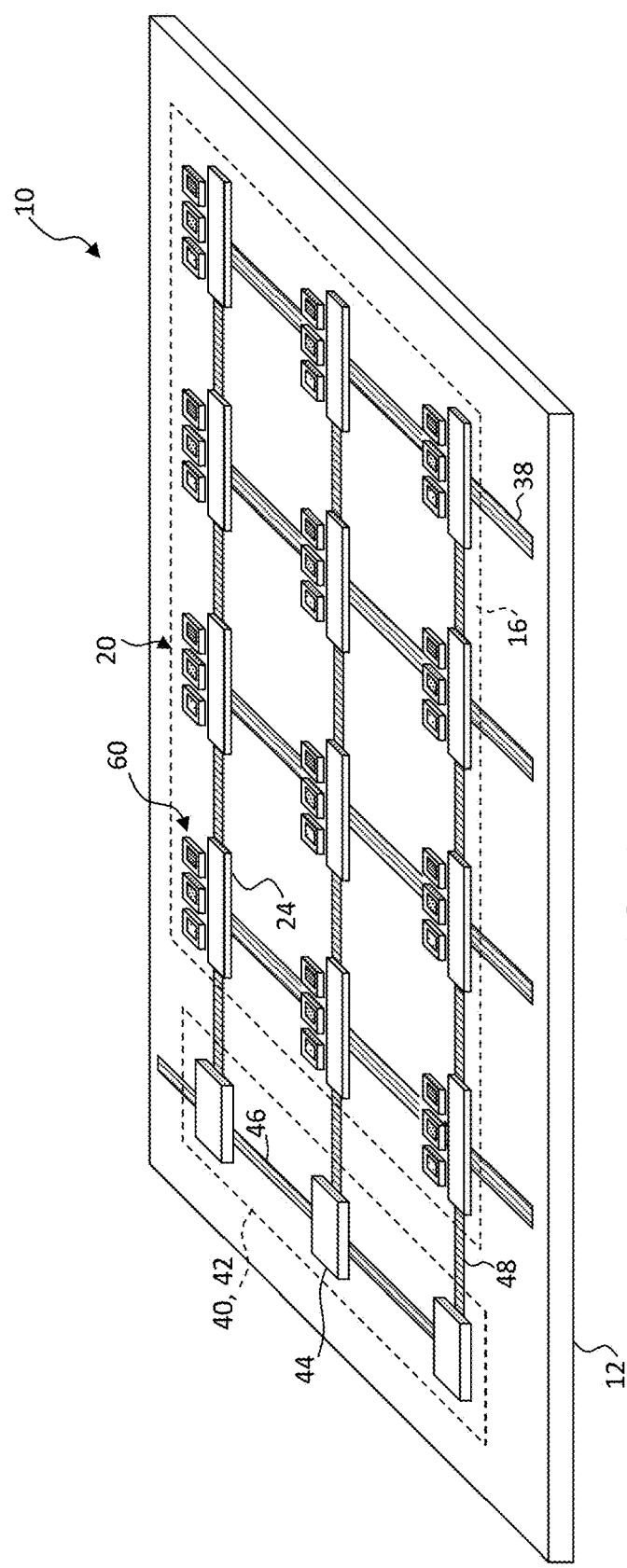
FIG. 4 is a perspective of a matrix-addressed system structure having multiple light elements and separate and independent row storage element substrates according to an embodiment of the present invention.

Referring to FIG. 4, the pixels 20 of FIG. 3 are distributed in an array having pixel rows and pixel columns on the system substrate 12 in the active area 16 (for clarity, the conductors 62 are not shown). In a further embodiment, the row-select circuit 40 is formed in or on one or more row-select substrates that are separate, distinct, and independent of the system substrate 12. The row-select circuit 40 can include a plurality of serially connected separate, distinct, and independent row-select substrates that each includes a row storage element 44 and provides one or more but less than all of the row lines 48. In the example embodiment of FIG. 4, each row-select substrate includes one row storage element 44 and therefore provides one of the row lines 48. In alternative embodiments, a row-select substrate can include multiple row storage element 44 and therefore provides a corresponding multiple of the row lines 48, since each row storage element 44 includes or is connected to one row lines 48, for example, with a drive transistor. The drive transistor can be considered a part of the row storage element 44, or can be a separate part that connects the row storage element 44 to the corresponding row line 48.

Figure 5:
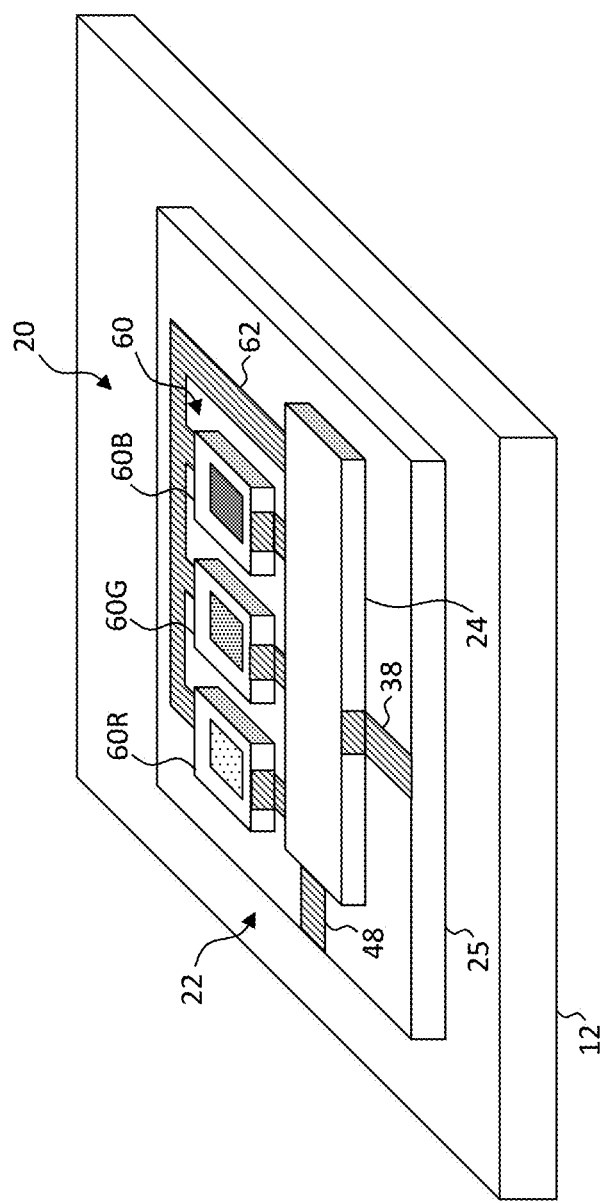
FIG. 5 is a perspective of a pixel structure having a pixel module substrate according to an embodiment of the present invention.
Figure 6:
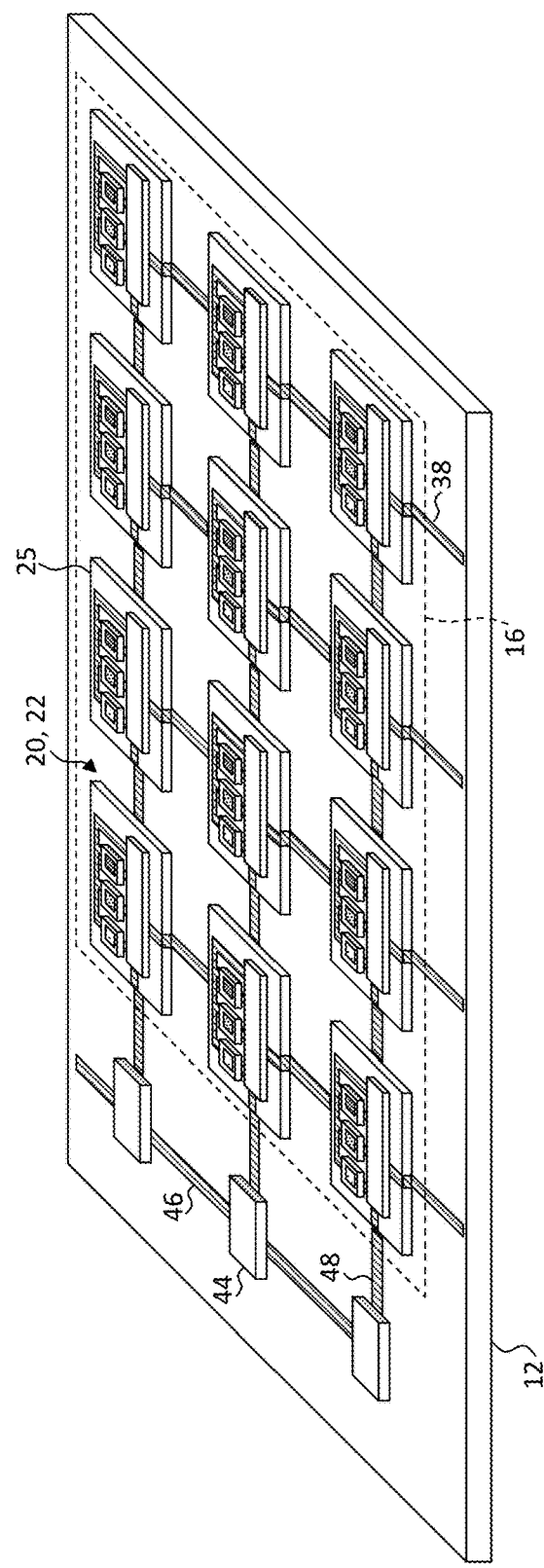
FIG. 6 is a perspective of a matrix-addressed system structure having a pixel module substrate according to an embodiment of the present invention.

In the embodiments of FIGS. 2, 3, and 4, the pixel substrates and the light element substrates are disposed on the system substrate 12, as are the row storage elements 44. Referring to FIGS. 5 and 6, in an alternative embodiment of the present invention, the pixel circuit 24 and the light elements 60 are disposed on a pixel module substrate 25 separate and distinct from the system substrate 12, the pixel substrate, and the light elements 60 (i.e., the substrate of the light elements 60). The pixel module substrate 25 is disposed on the system substrate 12. Thus, the pixel circuit 24 and light elements 60 are electrically connected on the pixel module substrate 25 and the pixel module substrate 25 is electrically to the system substrate 12, thereby electrically connecting the pixel circuits 24 and light elements 60 to the column line 38 and row line 48 as appropriate. The system substrate 12 can therefore be non-native to any combination of the light elements 60 (e.g., micro-LEDs), the pixel circuit 24 (e.g., the pixel substrates), the pixels 20, the pixel module substrate 25, or the row storage elements 44.

Figure 7:
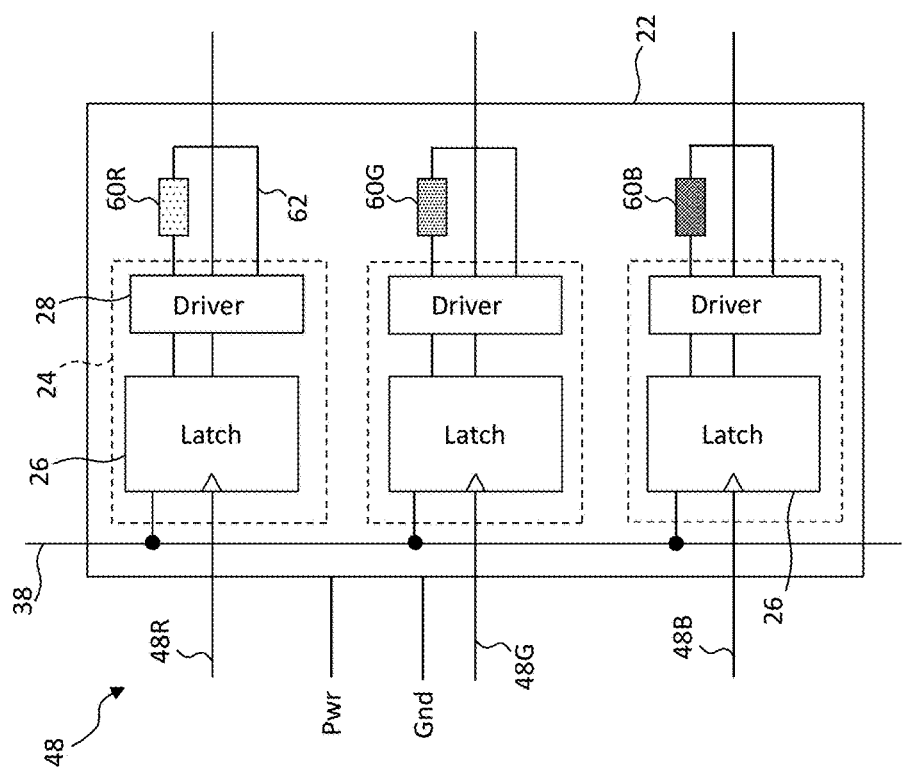
FIG. 7 is a schematic diagram of a pixel circuit according to an embodiment of the present invention corresponding to FIG. 1.

In the embodiment of FIG. 1, a full-color pixel module 22 includes three pixels 20, a pixel 20R, a pixel 20G, and a pixel 20B and each having a separate pixel circuit 24. The pixel circuits 24 can be logically or physically separate as shown in FIG. 2. Alternatively, a common pixel circuit 24, a common integrated circuit, or a common pixel substrate can be used, as shown in FIGS. 3-6. Referring to FIG. 7, each of the pixel circuits 24 are combined into a common pixel circuit 24 and provided on a common integrated circuit pixel substrate. In this arrangement, a different row line 48 is used, for example row lines 48R, 48G, 48B corresponding to each of the light elements 60R, 60G, 60B respectively to form a full-color pixel module 22.

Figure 8:
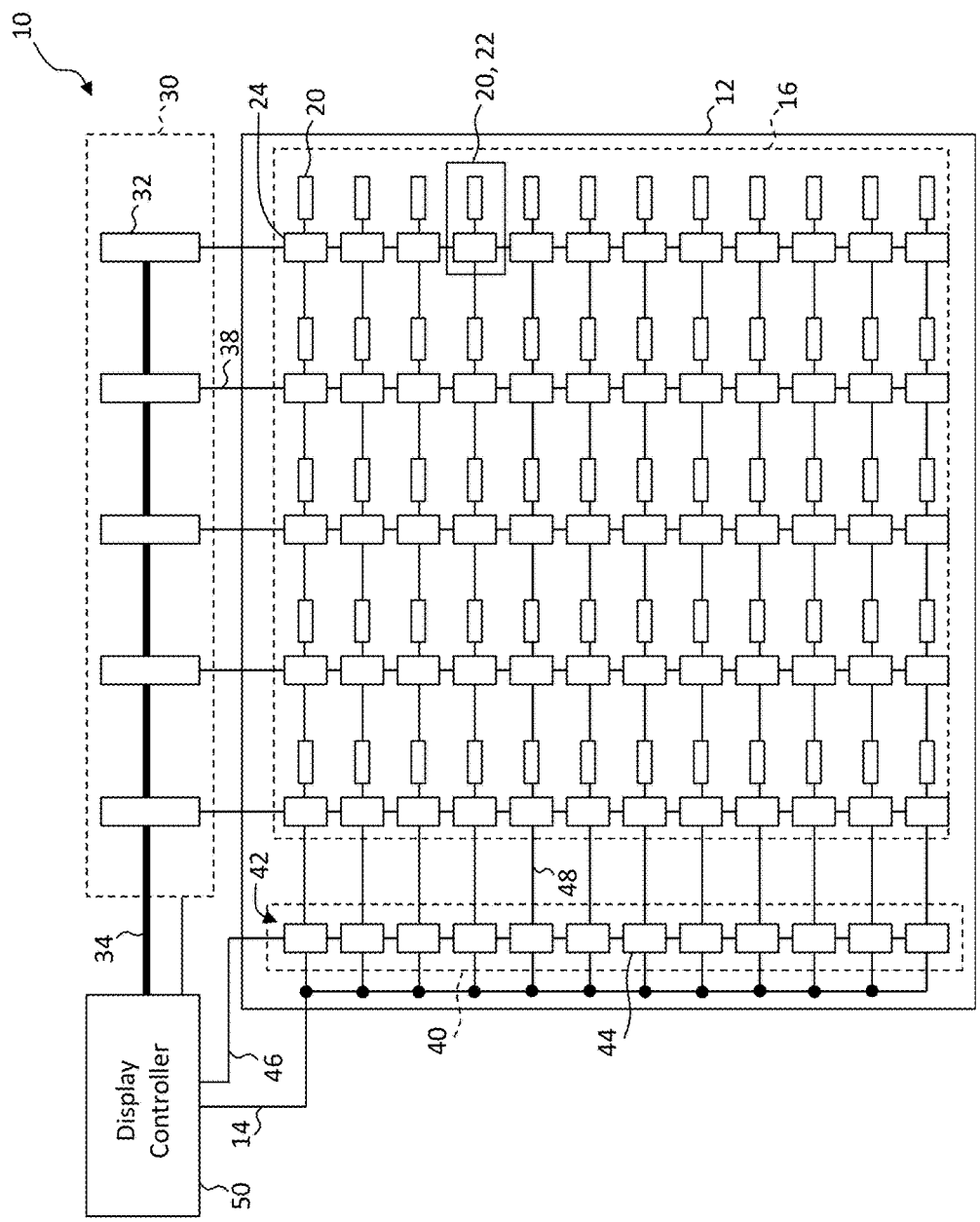
FIG. 8 is a schematic diagram of another embodiment of the present invention.
Figure 9:
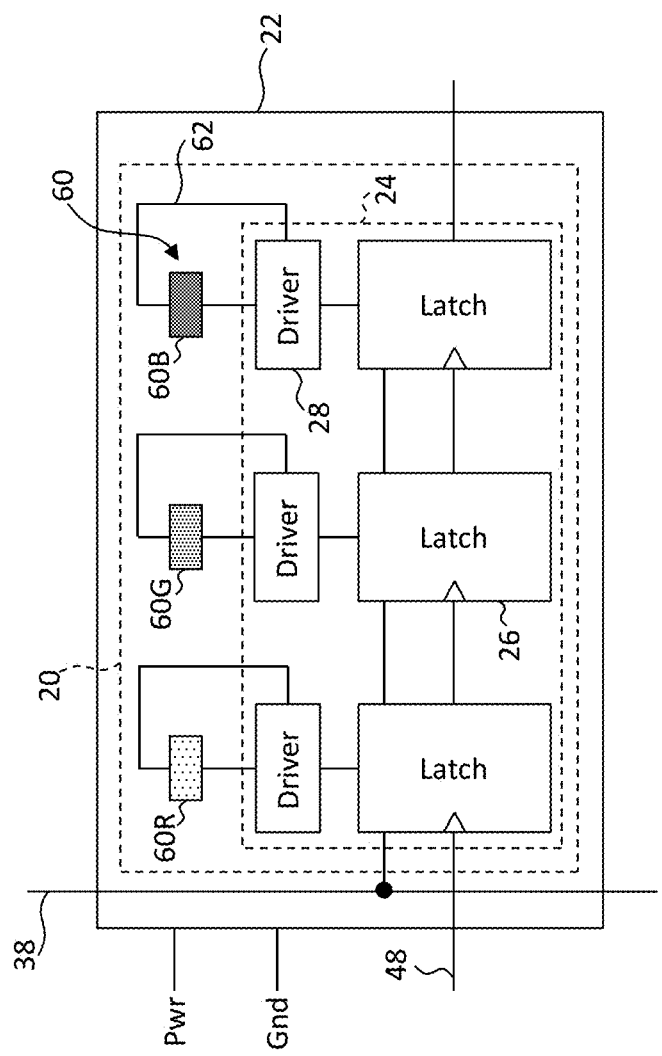
FIG. 9 is a schematic diagram of a pixel circuit according to an embodiment of the present invention corresponding to FIG. 8.

In an alternative embodiment, referring to FIGS. 8 and 9, a single row line 48 can be used to communicate a data value to each of multiple light elements 60 in the active area 16. As shown in FIG. 9, a series of pixel storage elements 26 are serially connected to form a pixel serial shift register (different from the serial shift register 42 of the row-select circuit 40). First data (for example blue data) is provided on the column line 38 and the row line 48 is enabled to load the blue data value into the first pixel storage element 26 in the pixel serial shift register. Second data (for example green data) is then provided on the column line 38 and the row line 48 is enabled a second time to load the green data value into the first pixel storage element 26 in the pixel serial shift register while the blue data value is serially shifted into the second pixel storage element 26. Third data (for example red data) is then provided on the column line 38 and the row line 48 is enabled a third time to load the red data value into the first pixel storage element 26 in the pixel serial shift register while the green data value is serially shifted into the second pixel storage element 26 and the blue data value is serially shifted into the third pixel storage element 26. In an embodiment, the pixel circuit 24 and light elements 60 of FIG. 9 form a single pixel 20. In an alternative embodiment, the pixel circuit 24 and light elements 60 of FIG. 9 form a plurality of pixels 20, for example three pixels 20, in a common row. The embodiment of FIG. 9 has the advantage of requiring fewer row lines 48.

The row-select circuit 40 can be implemented in a variety of ways. In one simple way, a serial shift register 42 with a common clock 14 is used, for example as illustrated in FIG. 1 where each of the row storage elements 44 is a flip flop (such as a D flip-flop) whose input is connected to the previous row storage element 44 in the serial shift register 42 and whose output is connected to the following row storage element 44 in the serial shift register 42.

Figure 10:
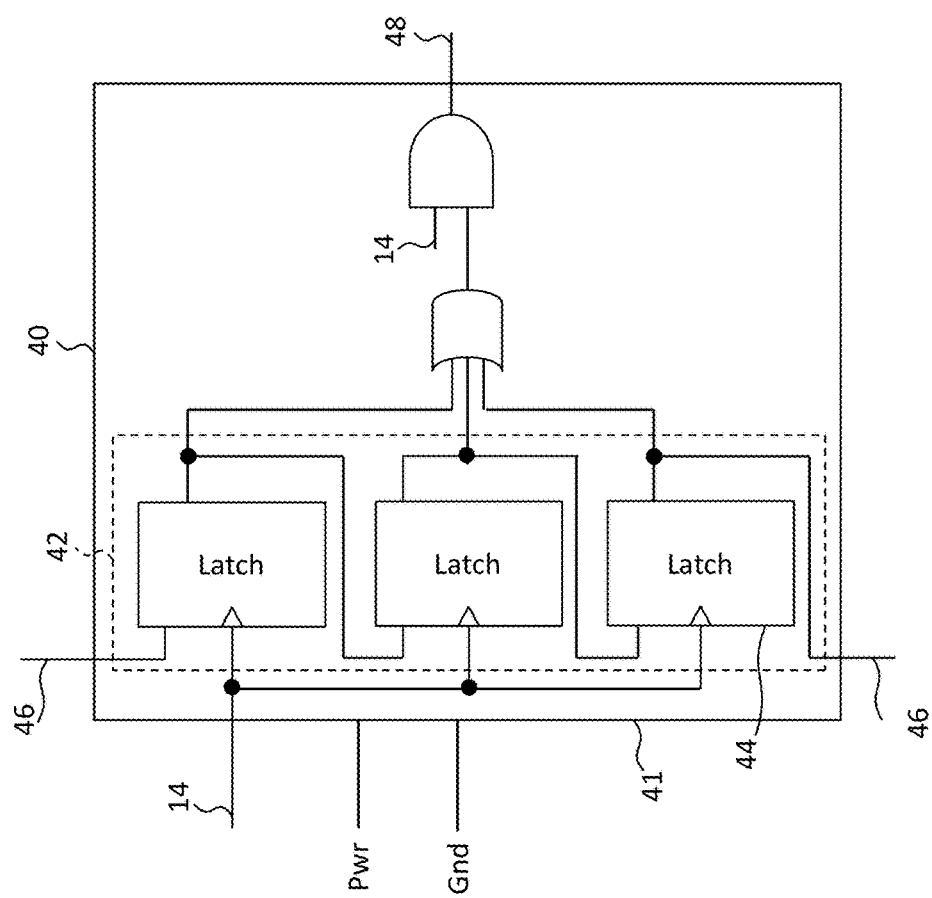
FIG. 10 is a schematic diagram of a row-select circuit according to an embodiment of the present invention.

In the alternative embodiment of FIGS. 8 and 9, each row line 48 is enabled three times to enter the data value on the column line 38 and clock the data value into the corresponding pixel 20. Therefore, the row-select circuit 40 must provide a repeated row line 48 signal on each row line 48. Referring to FIG. 10, each row storage element 44 is serially connected to a previous and a following row storage element 44 and has a common clock signal to transfer a row select control bit through the serial shift register 42. The row storage elements 44 are grouped into sets of three all of whose outputs are combined (for example using an OR logic circuit) to provide the repeated row select signal on the row line 48. To ensure that the row line 48 toggles three times as opposed to simply being held high for three clock cycles, it is combined with the clock 14 using an AND gate. In an embodiment of the present invention, the groups of three row storage elements 44 are provided in a row-select module 41 formed in a common integrated circuit and on a common substrate.

Figure 11:
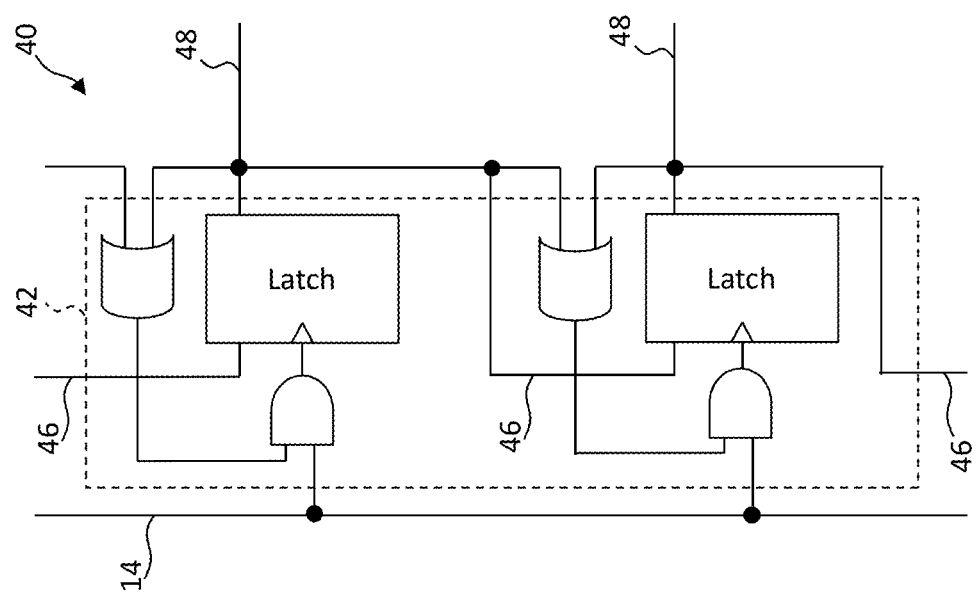
FIG. 11 is a schematic diagram of another row-select circuit according to another embodiment of the present invention.

However, in general, only a single row of the array of pixels 20 is selected at a time, so that only one row line 48 is active in the row-select circuit 40 at a time. Thus, only one row select control bit is passed through the serial shift register 42 at a time and only those row storage elements 44 whose stored value are changing need be active, as shown in FIG. 11. By limiting the number of row storage elements 44 that are active at a time, power consumption is reduced in the matrix-addressed system 10. However, in such an arrangement, at least initially the first row storage element 44 in the serial shift register 42 is active so that the row select control bit can be transferred into the serial shift register 42.

Referring to FIG. 11, at least a portion of the row-select circuit 40 is illustrated. The row storage elements 44 are serially connected but the clock that transfers data into each row storage element 44 is a combination of the system clock 14 and the stored values of the previous and current row storage elements 44 in the serial shift register 42. Thus, a row storage element 44 is only clocked if the previous row storage element 44 in the serial shift register 42 stores the row select control bit (so that the row storage element 44 can input the row select control bit) or if the row storage element 44 in the serial shift register 42 stores the row select control bit (so that the row storage element 44 can remove the row select control bit). In this embodiment, only two row storage elements 44 need be active at a time (ignoring the first row storage element 44 in the serial shift register 42).

Figure 12:
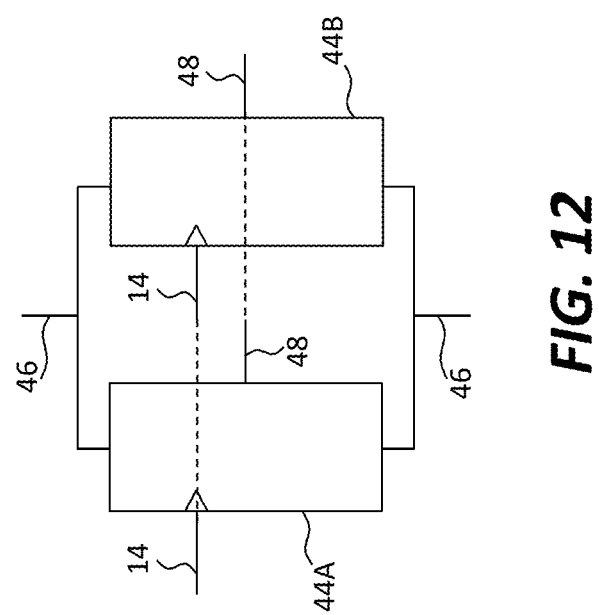
FIG. 12 is a schematic diagram of a redundant row storage element in a redundant row-select circuit according to an embodiment of the present invention.

According to an embodiment of the present invention and referring to FIG. 12, a redundant row storage element 44B is connected in parallel with each row storage element 44A to form a redundant row-select circuit 40. If one of the row storage modules is not functional, a single serial shift register 42 can fail. By providing two row storage elements 44 connected in parallel, if one fails the other can provide a functional row storage element 44. The redundant row storage elements 44 can form a redundant serial shift register 42 and redundant row-select circuit 40.

In operation, the embodiment of FIG. 1 is controlled by the system control 50. The system controller 50 provides a first row of data, for example image data, to the column-control circuit 30, for example by shifting sequential pixel data values through a shift register until the pixel data values in the row are stored in the column-control circuit 30 in alignment with the column-driver circuit 32 connected to the column line 38 and connected to the column of pixels 20 corresponding to the pixel data value in the row. The pixel data values are presented by the column-driver circuit 32 through the column line 38 to the columns of pixels 20. An enabling row select control bit (e.g., a one or HIGH signal) is shifted into the first row storage element 44 in the row-select circuit 40 by the row-control circuit 49 through the select control line 46. The row select control bit is stored in the first row storage element 44 in the serial shift register 42 and the output of the first row storage element 44 is driven, for example by a transistor, onto the row line 48, forming a clock signal for the first row of pixels 20 that transfers the pixel data values provided by the column-driver circuit 32 in the column-control circuit 30 through the column line 38 into the pixel circuits 24 of the pixels 20. The pixel circuits 24 then drive the light elements 60 with the stored pixel data values.

A second row of pixel data values is then loaded into the column-control circuit 30 (either after or during the row-select process; the column-control circuit 30 can have a double-buffered loading circuit). A disabling row select control bit (e.g., a zero or LOW signal) is shifted into the first row storage element 44 in the row-select circuit 40 by the row-control circuit 49 through the select control line 46 and the enabling control bit in the first row storage element 44 is shifted into the second row storage element 44 of the serial shift register 42 in response to the system clock 14. The row select control bit stored in the second row storage element 44 in the serial shift register 42 is driven onto the row line 48, forming a clock signal for the second row of pixels 20 that transfers the pixel data values provided by the column-driver circuit 32 in the column-control circuit 30 through the column line 38 into the pixel circuits 24 of the pixels 20 in the second row. The pixel circuits 24 in the second row then drive the light elements 60 with the stored pixel data values. Note that the pixel circuits 24 in the first row continue to drive their light elements 60 with their stored pixel data values. Hence, this embodiment provides active-matrix control.

The process repeats for each successive row of pixels 20 as the row select control bit is shifted through the serially connected row storage elements 44 of the serial shift register 42 until all of the rows of image data are stored in their corresponding rows of pixels, after which the process is repeated for another image.

In an embodiment of a full-color display for full-color images, each red, green, and blue pixel 20R, 20G, 20B is treated as a separate row of pixels 20. For example, the red pixels 20 of the first image row are first loaded into the red pixel circuits 24 of the first pixel row, the green pixels 20 of the first image row are loaded into the green pixel circuits 24 of the second pixel row, the blue pixels 20 of the first image row are loaded into the blue pixel circuits 24 of the third pixel row, the red pixels of the second image row are loaded into the red pixel circuits 24 of the fourth pixel row, the green pixels of the second image row are loaded into the green pixel circuits 24 of the fifth pixel row, the blue pixels of the second image row are loaded into the blue pixel circuits 24 of the sixth pixel row, and so on as illustrated in FIG. 1.

The operation of the embodiment of FIG. 8 is similar except that each row line 48 is enabled three times by the row-select circuit 40 (FIG. 10) to load multiple pixel data values into the pixel circuits 24 (FIG. 9). The operation of the column-control circuit 30 does not need to change. Note that although FIGS. 9 and 10 illustrate storing three values in the pixel circuit 24 of a pixel 20 (for example red, green, and blue values of a full-color pixel 20), any number of values can be stored; for example, pixel data values corresponding to multiple full-color pixels 20.

In both the embodiments of FIG. 1 and FIG. 8, if the light elements 60 are light sensors, for example photo-sensors, the row-selected pixel circuits 24 output data values stored in the pixel storage elements 26 onto the column lines 38 and the output of the pixel serial shift register is connected to the column line 38 rather than the input. The column-driver circuits 32 for each pixel column then transfers the received data values and transfers them with the column-control circuit 30 into the system controller 50. The row-select process and control is the same and the column-control circuit 30 operates in reverse, inputting data rather than outputting data. In other embodiments of the present invention, the light elements 60 are not restricted to the input or output of electromagnetic radiation. For example, the light elements 60 can be transducers of various types of energy, including electrical fields, magnetic fields, mechanical, electrical, and thermal energy. In an embodiment of the present invention, the matrix-addressed system 10 of the present invention is an area sensor such as a touchscreen sensor responsive to touches; for example touches indicated by changes in electrical fields such as are found in capacitive touch screens. A pixel 20 can be an output or an input device. Hence, embodiments of the present invention can be applied to any matrix-addressed system.

Figure 13:
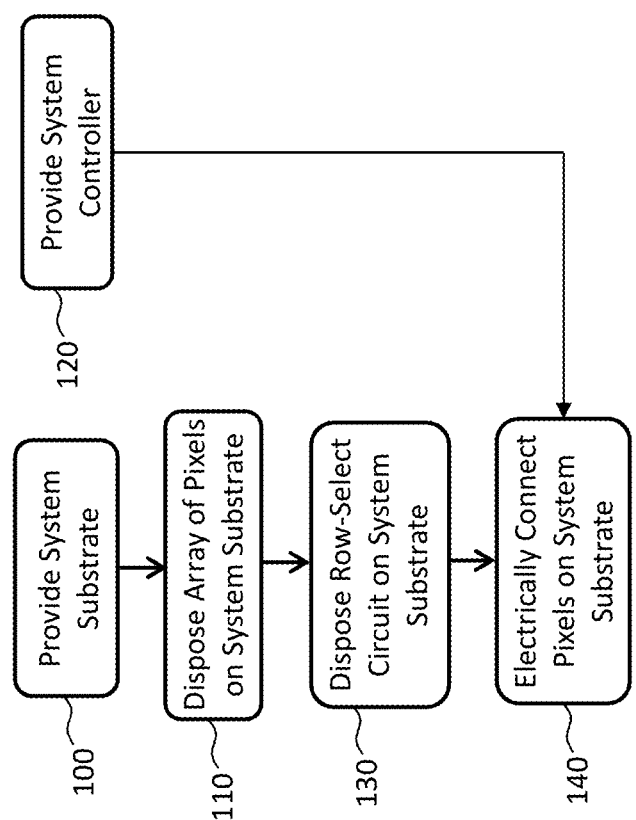
FIGS. 13 and 14 are flow diagrams according to embodiments of the present invention.

In an embodiment of the present invention, and referring to FIG. 13, a method of making a matrix-addressed system 10 includes providing a system substrate 12 in step 100 and disposing an array of pixels 20 on the system substrate 12 in step 110. The array of pixels 20 can be disposed on the system substrate 12 by micro-transfer printing, for example micro-transfer printing chiplets, bare die, or unpackaged integrated circuits. The row-select circuit 40 is disposed on the system substrate 12 in step 130; for example by forming the row-select circuit 40 on the system substrate 12, locating components on the system substrate 12, for example, using pick-and-place techniques for discrete or integrated circuit components, or by micro-transfer printing one or more circuits, for example micro-transfer printing a plurality of bare die chiplets or integrated circuits, each chiplet including one or more row storage elements 44. In an embodiment, the row-select circuit 40 is micro-transfer printed onto the system substrate 12 by printing a plurality of row-select substrates onto the system substrate 12. The row-select substrates each include at least a portion of the row-select circuit 40. In step 120 a system controller 50 is provided and the system controller 50, the pixels 20, and the row-select circuit 40 are electrically connected in step 140, for example, using photolithographic techniques.

Figure 14:
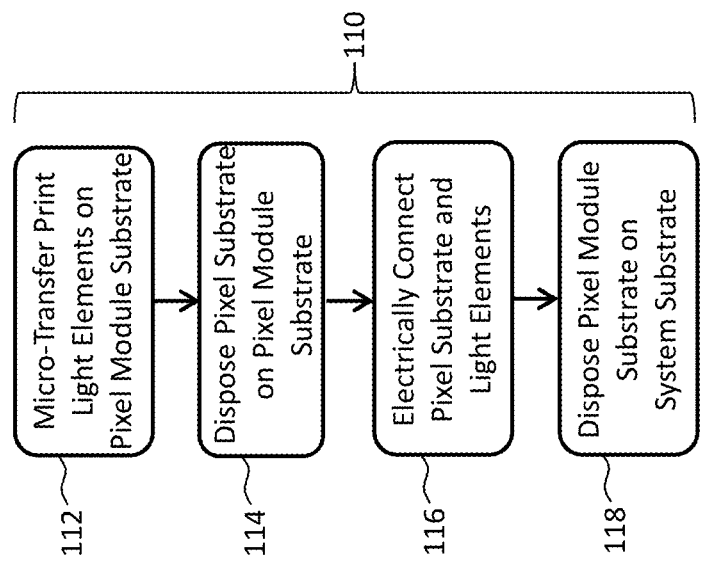

Referring to FIG. 14 in a further embodiment of the present invention, the step 110 of disposing the array of pixels 20 on the system substrate 12 can include the steps of micro-transfer printing the light elements 60 onto a pixel module substrate 25 in step 112. The pixel module substrate 25 can be a semiconductor substrate such as a wafer or a glass, plastic, metal, or ceramic substrate. The pixel circuit 24 can also be formed on a pixel substrate and micro-transfer printed onto the pixel module substrate 25 in step 114 and electrically connected to the light elements 60, for example using photolithography in step 116. The pixel module substrate 25 is then disposed on the system substrate 12 in step 118, for example, by micro-transfer printing or using pick-and-place techniques, and then electrically connected to the system substrate 12, system controller 50, and column-control circuit 30.

In some embodiments of the present invention, and with reference to at least to FIGS. 3-6, 9, 15, and 16, an active-matrix system 10 comprises a system substrate 12, pixel elements 60 disposed in pixel rows and pixel columns on the system substrate 12, and pixel circuits 24 disposed in circuit rows and circuit columns on the system substrate 12. Each pixel element 60 is in one pixel row and one pixel column. Each pixel circuit 24 controls two or more of the pixel elements 60. A row line 48 (e.g., a row-select line 48) and a column line 38 (e.g., a column-data line 38) (e.g., a single row line 48 and a single column line 38) are electrically connected to each pixel circuit 24. The number of row lines 48 is less than the number of pixel rows, the number of column lines 38 is less than the number of pixel columns, or the number of row lines 48 is less than the number of pixel rows and the number of column lines 38 is less than the number of pixel columns. Thus, there are fewer row lines 48 than pixel rows, there are fewer column lines 38 than pixel columns, or there are fewer row lines 48 than pixel rows and fewer column lines 38 than pixel columns. The number of circuit rows can be the same as the number of row lines and the number of circuit columns can be the same as the number of column lines.

Figure 15:
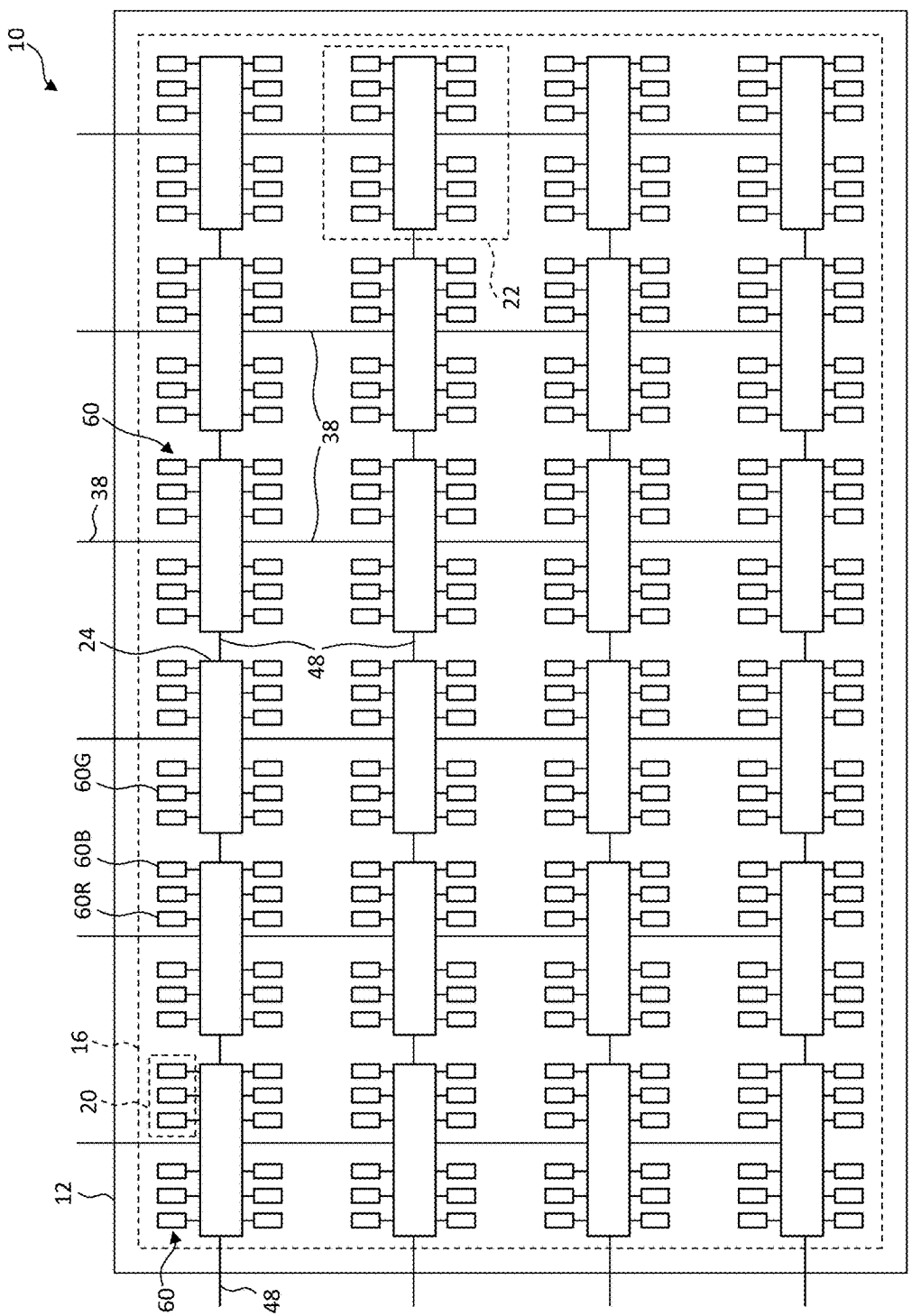
FIG. 15 is a schematic diagram of an active-matrix system according to illustrative embodiments of the present invention.
Figure 16:
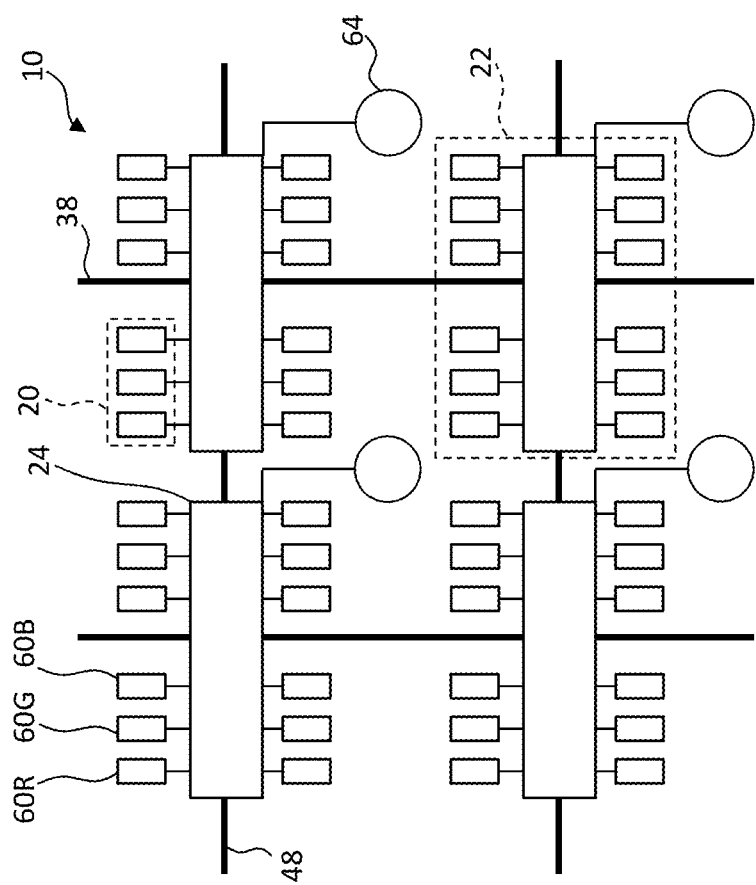
FIG. 16 is a schematic diagram of an active-matrix system according to illustrative embodiments of the present invention.

In some embodiments, and as shown, for example, in FIGS. 4, 15 and 16, at least a portion of the pixel circuits 24 of an active-matrix system 10 are disposed between pixel elements 60. When one component (e.g., a pixel circuit 24) is "between" a set of components (e.g., pixel elements 60), it is meant that the one component lies on a line connecting at least one pair of two of the set of components. In some embodiments, and as shown in FIGS. 15 and 16 for example, for each of a plurality of pixel circuits 24 in an active-matrix system 10, the pixel elements 60 controlled by the pixel circuit 24 are disposed adjacent at least two sides of the pixel circuit 24. In FIG. 4, for example, pixel elements 60 are disposed adjacent to only one side of the pixel circuit 24 to which they are connected. In some embodiments, the pixel circuits 24 of an active-matrix system 10 are contained, over the surface of the system substrate 12, within the convex hull of the pixel elements 60 (e.g., the active area 16 is the convex hull of the pixel elements 60 of the active-matrix system 10).

In more detail, active-matrix systems 10 according to certain embodiments of the present invention comprise a system substrate 12 having an active area 16. Pixel elements 60 are disposed on, in, over, or under the system substrate 12. In certain embodiments of the present invention, the pixel elements 60 are light emitters (e.g., light-emitting diodes such as inorganic light-emitting diodes) or light sensors. The pixel elements 60 are arranged in the active area 16 in a pixel element array having pixel rows and pixel columns. Each pixel element 60 in the pixel element array is in or is a part of one of the pixel rows and one of the pixel columns.

Figure 17:
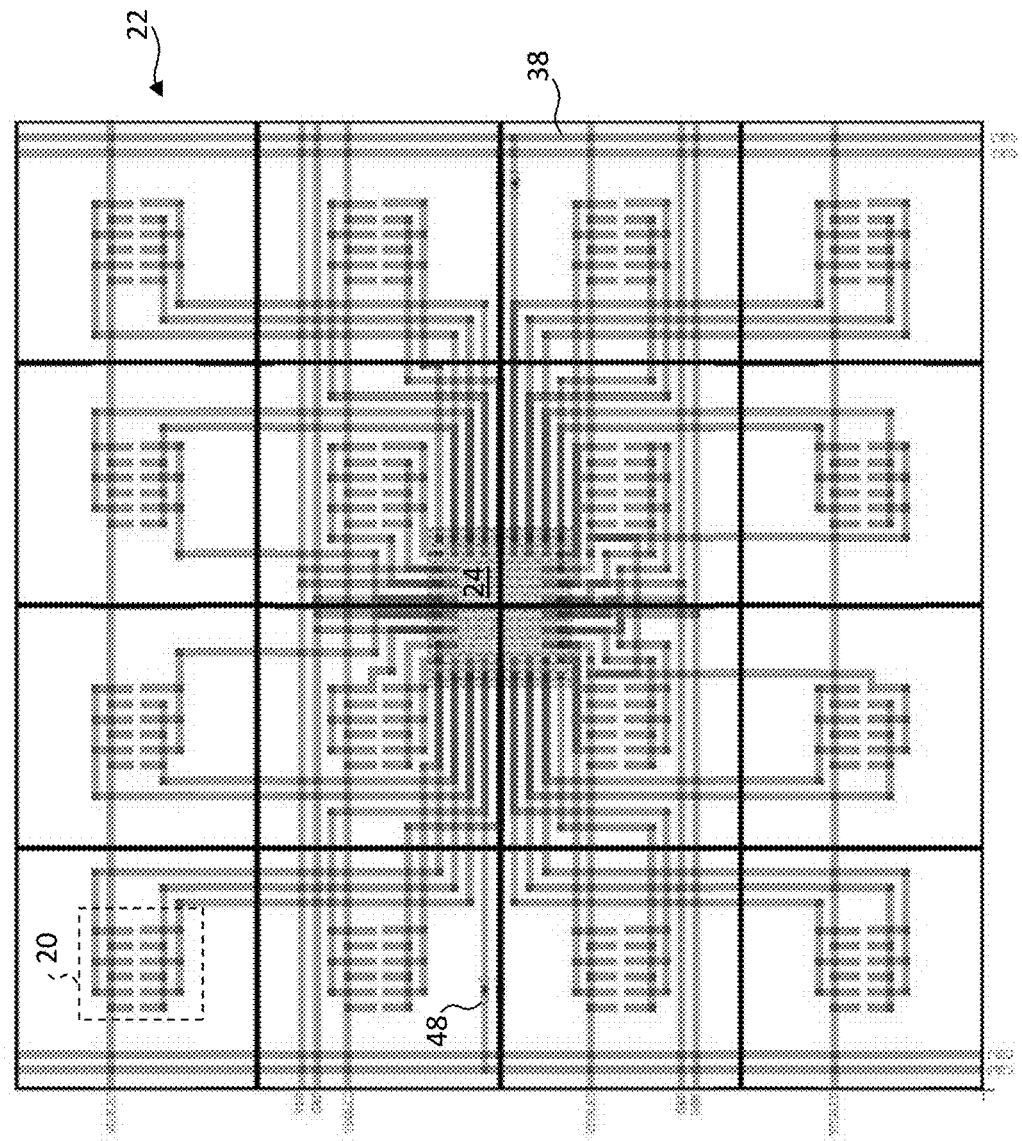
FIG. 17 is a layout of a multi-color pixel according to illustrative embodiments of the present invention.

In certain embodiments, pixel circuits 24 are disposed on, in, over, or under the system substrate 12 in the active area 16 in a pixel circuit 24 array having circuit rows and circuit columns. Each of the pixel circuits 24 is in one of the circuit rows or one of the circuit columns and is independent of each other of the pixel circuits 24. An independent pixel circuit 24 can operate independently of the operation of other pixel circuits 24. Each of the pixel circuits 24 is electrically connected to and controls two or more of the pixel elements 60, and the pixel circuits 24 number less than the pixel elements 60, that is there are fewer pixel circuits 24 than pixel elements 60 in the active-matrix system 10. For example, as shown in FIGS. 3-6 and 9, every pixel circuit 24 controls three pixel elements 60 so that there are three times as many pixel elements 60 as there are pixel circuits 24 in the active-matrix systems 10 that are shown. The three controlled pixel elements 60 can form a three-color pixels 20, for example red, green, and blue. Referring to FIGS. 15-16, every pixel circuit 24 controls twelve pixel elements 60 so that there are twelve times as many pixel elements 60 as there are pixel circuits 24 in the active-matrix system 10. In some such embodiments, the pixel circuits 24 can each control four three-color pixels 20. In some embodiments, full-color pixels can comprise more than three pixel elements 60 that each emit different colors of light, for example red, green, blue, and yellow. Referring to FIG. 17, the dashed box labelled pixel 20 comprises three pixel elements 60 with 16 such pixels 20 shown, so that every pixel circuit 24 controls at least forty-eight pixel elements 60 so that there are at least forty-eight times as many pixel elements 60 as there are pixel circuits 24 in the active-matrix system 10 that is shown. The pixel circuits 24 can be pixel controllers or micro-controllers, for example.

Row lines 48 (e.g., row-select lines 48) are disposed on, in, over, or under the system substrate 12 in its active area 16. In certain embodiments, each row line 48 is electrically connected to all of the pixel circuits 24 in one of the circuit rows to provide information in common to all of the pixel circuits 24 in the one circuit row, or receive information in common from all of the pixel circuits 24 in the one circuit row, through the row line 48. The information can be, for example, control signals or data, or both.

Column lines 38 (e.g., column-data lines 38) are electrically separate from the row lines 48 and are disposed on, in, over, or under a system substrate 12 in its active area 16. In certain embodiments, each column line 38 is electrically connected to all of the pixel circuits 24 in one of the circuit columns to provide information in common to all of the pixel circuits 24 in the one circuit column, or receive information in common from all of the pixel circuits 24 in the one circuit column, through the column line 38. The information can be, for example, control signals or data, or both. Row lines 48 and column lines 38 can be disposed in different layers of a system substrate 12 to prevent electrical shorts between them, or otherwise electrically isolated.

In some embodiments, row lines 48 number less than pixel rows. In some embodiments, column lines 38 number less than pixel columns. In some embodiments, row lines 48 number less than pixel rows and column lines 38 number less than pixel columns. As shown in FIG. 9, each pixel circuit 24 can comprise a pixel storage element 26 that stores information in response to signals communicated on a row line 48 and a column line 38 to which the pixel circuit 24 is electrically connected.

In some embodiments of the present invention, each pixel element 60 comprises one or more broken (e.g., fractured) or separated tethers, for example as a consequence of micro-transfer printing the pixel element 60 from a source wafer to a system substrate 12.

In some embodiments of an active-matrix system 10, a system substrate 12 is a display substrate, its active area 16 is a display area, pixel elements 60 are one or more of controllable light-reflective pixels, controllable light-absorbing pixels, and controllable light-emitting pixels, and the active-matrix system 10 is an active-matrix display. Each of the pixel elements 60 can comprise an inorganic light-emitting diode and each inorganic light-emitting diode can comprise one or more broken (e.g., a fractured) or separated tethers, for example as a consequence of micro-transfer printing the light-emitting diode from a source wafer to the system substrate 12.

In some embodiments of the present invention, pixel elements 60 controlled by a common pixel circuit 24 comprise two or more light-controlling elements. Each light-controlling element of the two or more light-controlling elements controls a different color of visible light than each other of the two or more light-controlling elements. Thus, each pixel circuit 24 can control a multi-color pixel 20 with two or more pixel elements 60. In some embodiments, each pixel circuit 24 controls multiple multi-color pixels 20 (e.g., as shown in FIGS. 15-17).

In some embodiments, referring to FIG. 16, a sensor 64 is disposed on, in, over, or under a system substrate 12 (e.g., a display substrate) and electrically connected to one or more pixel circuits 24. The pixel circuit 24 can comprise sensor circuits that control, operate, or respond to the sensor 64. Sensors 64 can be, for example, photo-sensors such as photo-diodes or photo-transistors and electrically connected with wires formed on a system substrate 12 to pixel circuit(s) 24. Each sensor 64 can comprise a broken or separated tether, for example as a consequence of micro-transfer printing the sensor 64 from a source wafer to a system substrate 12.

In some embodiments of an active-matrix system 10, a system substrate 12 is a sensor substrate, its active area 16 is a sensor area, pixel elements 60 are light-responsive pixels, and the active-matrix system 10 is an image sensor. Each of the pixel elements 60 can comprise a sensor 64 such as a photo-diode or a photo-transistor. Each sensor 64 of the pixel elements 60 can comprise one or more broken (e.g., fractured) or separated tethers, for example as a consequence of micro-transfer printing the sensor 64 from a source wafer to the system substrate 12.

In some embodiments of the present invention, pixel circuits 24 are digital controllers and a pixel storage element 26 of each of the pixel circuits 24 stores digital values corresponding to a value associated with two or more pixel elements 60 controlled by the pixel circuit 24, for example in latches or flip-flops. In some embodiments, row lines 48 conduct digital signals, column lines 38 conduct digital signals, or row lines 48 and column lines 38 both conduct digital signals.

In some embodiments of the present invention, pixel circuits 24 are analog controllers and a pixel storage element 26 of each of the pixel circuits 24 stores analog values corresponding to a value associated with two or more pixel elements 60 controlled by the pixel circuit 24, for example as a charge in a capacitor. In some embodiments, row lines 48 conduct analog signals, column lines 38 conduct analog signals, or row lines 48 and column lines 38 both conduct analog signals.

In some embodiments of the present invention, and as shown, for example, in FIG. 1, an active-matrix system 10 comprises row drivers (e.g., row storage elements 44) electrically connected to each of the row lines 48, column drivers (e.g., column-driver circuits 32) electrically connected to each of the column lines 38, or row drivers electrically connected to each of the row lines 48 and column drivers electrically connected to each of the column lines 38 (for example as shown in FIGS. 1, 4, 6, and 8). For example, there can be one or more row lines 48 electrically connected to a row driver or one or more column lines 38 electrically connected to a column driver or both. In some embodiments of the present invention, row lines 48 conduct pulse-width modulation signals, control signals, and timing signals provided by a row storage element 44 (e.g., in a row driver) of a row-select circuit 40. Column lines 38 can conduct data values, for example serial bit streams provided by a column-driver circuit 32 in a column-control circuit 30.

In some embodiments of the present invention, pixel elements 60 controlled by a common pixel circuit 24 are arranged in various configurations. For example, in some embodiments, two or more of the pixel elements 60 controlled by each pixel circuit 24 are in a common pixel row or are in a common pixel column such that the two or more of the pixel elements 60 form a one-dimensional array of pixel elements 60. For example, FIG. 4 shows a one-dimensional array of pixel elements 60 for each pixel circuit 24. In some embodiments, at least two of the two or more of the pixel elements 60 controlled by each pixel circuit 24 are in different rows and in different columns such that the two or more of the pixel elements 60 form a two-dimensional array of pixel elements 60. For example, FIGS. 15 and 16 illustrate embodiments in which a pixel circuit 24 controls four three-color pixels 20, each comprising three pixel elements 60. The pixels are arranged in a two-by-two array and the pixel elements 60 are arranged in a six-by-two array. Referring to the layout of FIG. 17, a pixel circuit 24 controls a four-by-four array of three-color pixels 20. FIG. 17 provides electrical interconnections for sixteen three-color pixel modules 22 such as those of FIG. 5, each with wiring for two redundant or replacement modules, but the pixel modules 22 themselves are not shown in FIG. 17.

In some embodiments of the present invention, and as shown in FIG. 5 and laid out in FIG. 17, an active-matrix system 10 comprises pixel module substrates 25 disposed on a system substrate 12. At least one pixel circuit 24 and two or more pixel elements 60 controlled by each of the at least one pixel circuits 24 is disposed on each pixel module substrate 25. Each of the pixel module substrates 25 can comprise one or more broken (e.g., fractured) or separated tether as a consequence of micro-transfer printing the pixel module substrates 25 from a source wafer on or in which the pixel module substrates 25 are assembled to the system substrate 12.

In some embodiments of the present invention, each pixel element 60 is or comprises one or more micro-devices that each have at least one of a width from 2 to no more than 5 µm, 5 to no more than 10 µm, 10 to no more than 20 µm, or 20 to no more than 50 µm, a length from 2 to no more than 5 µm, 5 to no more than 10 µm, 10 to no more than 20 µm, or 20 to no more than 50 µm, and a thickness from 2 to no more than 5 µm, 5 to no more than 10 µm, 10 to no more than 20 µm, or 20 to no more than 50 µm. Similarly, each pixel circuit 24 can be or comprise one or more micro-devices that each have at least one of a width from 2 to no more than 5 µm, 5 to no more than 10 µm, 10 to no more than 20 µm, or 20 to no more than 50 µm, a length from 2 to no more than 5 µm, 5 to no more than 10 µm, 10 to no more than 20 µm, or 20 to no more than 50 µm, and a thickness from 2 to no more than 5 µm, 5 to no more than 10 µm, 10 to no more than 20 µm, or 20 to no more than 50 µm.

In some embodiments of the present invention, a matrix-addressed system 10 includes an array of pixels 20 arranged in rows and columns in an active area 16 of a system substrate 12 and a column-control circuit 30 for providing information to or receiving information from the pixels 20. The column-control circuit 30 includes a separate column-driver circuit 32 connected to each column of pixels 20 that provides or receives information in common to all of the pixels 20 in the column. A row-select circuit 40 is disposed on the system substrate 12. The row-select circuit 40 includes a serial shift register 42 having a number of row storage elements 44 equal to or larger than the number of rows in the array of pixels 20. Each row storage element 44 in the shift register has a row line 48 connected to all of the pixels 20 in a row. In one arrangement, the pixels 20 and the row select circuit 40 are disposed on a system substrate 12, for example using micro-transfer printing.

The row-select circuit 40, or portions of it such as one or more row storage elements 44, the pixel circuits 24, or light elements 60 can be made in one or more integrated circuits having separate, independent, and distinct substrates; for example, bare die. For example, they can be chiplets, small, unpackaged integrated circuits such as unpackaged dies interconnected with wires connected to contact pads on the chiplets. The chiplets can be disposed on an independent substrate, such as a backplane or system substrate 12. In an embodiment, the chiplets are made in or on a semiconductor wafer and have a semiconductor substrate and the system substrate 12 is or includes glass, resin, polymer, plastic, or metal. Semiconductor materials (for example silicon or GaN) and processes for making small integrated circuits are well known in the integrated circuit arts. Likewise, backplane substrates and means for interconnecting integrated circuit elements on the system substrate 12 are well known in the printed circuit board arts. The chiplets can be applied to the system substrate 12 using micro transfer printing.

In useful embodiments the system substrate 12 includes material, for example glass or plastic, different from a material in an integrated-circuit substrate; for example, a semiconductor material such as silicon or GaN. The light emitters 60 can be formed separately on separate semiconductor substrates, assembled onto the pixel module substrate 25, for example by micro-transfer printing, and then the assembled unit is located on the surface of the system substrate 12. This arrangement has the advantage that the light elements 60 can be separately tested on the pixel module substrate 25 and the pixel module substrates 25 accepted, repaired, or discarded before the pixel module substrate 25 is located on the system substrate 12, thus improving yields and reducing costs.

In one method of the present invention, the pixel module substrates 25 are formed and disposed on the system substrate 12 by micro transfer printing using compound micro assembly structures and methods, for example as described in U.S. patent application Ser. No. 14/822,868 filed Aug. 10, 2015, entitled Compound Micro-Assembly Strategies and Devices. Alternatively, the pixel module substrates 25 are disposed on the system substrate 12 using pick-and-place methods found in the printed-circuit board industry, for example using vacuum grippers. The pixel module substrates 25 on the system substrate 12 can be interconnected using photolithographic methods and materials or printed circuit board methods and materials.

In an embodiment, the light element drive circuits 28 drive the light elements 60 with a current-controlled drive signal. The current-controlled drive signal can convert an analog value (e.g., a charge stored in a capacitor analog pixel storage element 26) to a current drive signal or, as shown, the current-controlled drive signal can convert a digital bit value (e.g., a voltage stored in a flip-flop or latch digital pixel storage element 26) to a current drive signal, thus forming a bit-to-current convertor. Current-drive circuits, such as current replicators, are known in the art and can be controlled with a pulse-width modulation scheme whose pulse width is determined by the digital bit value. A separate light element drive circuit 28 can be provided for each light element 60, as shown, or a common light element drive circuit 28, or a light element drive circuit 28 with some common components, can be used to drive the light elements 60 in response to the data values stored in the pixel storage elements 26. A power connection, a ground connection, a data input (e.g., column data 38), and a clock signal (e.g., a signal on the row line 48) control the pixel storage element 26. In the serially connected embodiment (FIG. 6), data values are transferred through the pixel storage elements 26 of the pixel circuit 24 by clocking the flip-flops.

The system controller 50 can include a memory for storing calibration and display pixel data values for the display that are communicated to the column-control circuit 30.

Although not specifically illustrated in the Figures or as a method step, the provision of the matrix-addressed system 10 can include forming conductive wires on the system substrate 12 or pixel module substrate 25 using photolithographic and display substrate processing techniques; for example, photolithographic processes employing metal or metal oxide deposition using evaporation or sputtering, curable resin coatings (e.g., SU8), positive or negative photo-resist coating, radiation (e.g. ultraviolet radiation) exposure through a patterned mask, and etching methods to form patterned metal structures, vias, insulating layers, and electrical interconnections. Inkjet and screen-printing deposition processes and materials can be used to form patterned conductors or other electrical elements. The conductors 62, or wires, can be fine interconnections, for example having a width of less than 50 microns, less than 20 microns, less than 10 microns, less than five microns, less than two microns, or less than one micron. Such fine interconnections are useful for interconnecting chiplets, for example as bare dies with contact pads and used with the system substrate 12 or pixel module substrate 25. Alternatively, wires can include one or more crude lithography interconnections having a width from 2 µm to 2 mm, wherein each crude lithography interconnection electrically connects the light elements 60, pixel circuits 24, or row-select circuit 40 to the system substrate 12 or pixel module substrate 25.

The system controller 50 can be external to the system substrate 12 (for example on a separate printed circuit board substrate). In this embodiment, the system controller 50 can be electrically connected to the conductors 62 including row lines 48 and column lines 38 using connectors, ribbon cables, or the like). In an alternative embodiment, not shown, the system controller 50 is located on the system substrate 12 outside the system substrate area defined by the array of pixels 20. In this alternative, the system controller 50 is electrically connected to the conductors 62 including row lines 48 and column lines 38 using wires and buses, for example, using surface mount and soldering technology.

In an embodiment, the light elements 60 (e.g. micro-LEDs or micro-photo-sensors) are transfer printed to the pixel module substrates 25 or the system substrate 12 in one or more transfers. For a discussion of micro-transfer printing techniques see, U.S. Pat. Nos. 8,722,458, 7,622,367 and 8,506,867, each of which is hereby incorporated by reference. The transferred light elements 60 are then interconnected, for example with conductors 62 including row lines 48 and column lines 38 and optionally including connection pads and other electrical connection structures, to enable the system controller 50 to electrically interact with the light elements 60 to emit or receive light in the matrix-addressed system 10 of the present invention. In an alternative process, the transfer of the light elements 60 is performed before or after all of the conductors 62 are in place. Thus, in embodiments, the construction of the conductors 62 can be performed before the light elements 60 are printed or after the light elements 60 are printed or both.

According to various embodiments of the present invention, the system substrate 12 usefully has two opposing smooth sides suitable for material deposition, photolithographic processing, or micro-transfer printing of micro-LEDs or photo-sensors. The system substrate 12 can have a size of a conventional display or sensor array, for example, a rectangle with a diagonal of a few centimeters to one or more meters. Such substrates are commercially available. The system substrate 12 can include polymer, plastic, resin, polyimide, PEN, PET, metal, metal foil, glass, a semiconductor, or sapphire and have a transparency greater than or equal to 50%, 80%, 90%, or 95% for visible light. In some embodiments of the present invention, the light elements 60 emit or receive light through the system substrate 12. In other embodiments, the light elements 60 emit or receive light in a direction opposite the system substrate 12. The system substrate 12 can have a thickness from 5 to 10 microns, 10 to 50 microns, 50 to 100 microns, 100 to 200 microns, 200 to 500 microns, 500 microns to 0.5 mm, 0.5 to 1 mm, 1 mm to 5 mm, 5 mm to 10 mm, or 10 mm to 20 mm. According to embodiments of the present invention, the system substrate 12 can include layers formed on an underlying structure or substrate, for example a rigid or flexible glass or plastic substrate.

In an embodiment, the system substrate 12 can have a single, connected, contiguous system substrate area that includes the light elements 60 and the light elements 60 each have a light-emissive or light-receptive area. The combined light-emissive areas of the plurality of light elements 60 is less than or equal to one-quarter of the contiguous system substrate area. In further embodiments, the combined light-emissive or light-receptive areas of the plurality of light elements 60 is less than or equal to one eighth, one tenth, one twentieth, one fiftieth, one hundredth, one five-hundredth, one thousandth, one two-thousandth, or one ten-thousandth of the contiguous system substrate area. The light-emissive or light-receptive area of the light elements 60 can be only a portion of the light elements 60. In a typical light-emitting diode, for example, not all of the semiconductor material in the light-emitting diode necessarily emits light. Therefore, in another embodiment, the light elements 60 occupy less than one quarter of the system substrate area.

In an embodiment of the present invention, the light elements 60 are micro-light-emitting diodes (micro-LEDs) or photo-sensors, for example, having light-emissive or light-sensitive areas of less than 10, 20, 50, or 100 square microns. In other embodiments, the light elements 60 have physical dimensions that are less than 100 μm, for example having a width from 2 to 5 μm, 5 to 10 μm, 10 to 20 μm, or 20 to 50 μm, having a length from 2 to 5 μm, 5 to 10 μm, 10 to 20 μm, or 20 to 50 μm, or having a height from 2 to 5 μm, 4 to 10 μm, 10 to 20 μm, or 20 to 50 μm. The light elements 60 can have a size of one square micron to 500 square microns. Such micro-light elements 60 have the advantage of a small light-emissive or light-sensitive area compared to their brightness or sensitivity. Moreover, light elements 60 that are micro-light-emitting diodes can provide excellent color purity, highly saturated colors, and a substantially Lambertian emission providing a wide viewing angle.

According to various embodiments, the matrix-addressed system 10, for example as used in a display or sensor array of the present invention, includes a variety of designs having a variety of resolutions, light element 60 sizes, and a range of system substrate areas. For example, system substrate areas ranging from 1 cm by 1 cm to 1 m by 1 m in size are contemplated. In general, larger light elements 60 are most useful, but are not limited to, larger system substrate areas. The resolution of light elements 60 over a system substrate 12 can also vary, for example from 50 light elements 60 per inch to hundreds of light elements 60 per inch, or even thousands of light elements 60 per inch. For example, a three-color display can have one thousand 10μ×10μ light emitters 60 per inch (on a 25-micron pitch). Thus, the present invention has application in both low-resolution and very high-resolution displays or sensor arrays. An approximately one-inch 128-by-128-pixel display having 3.5 micron by 10-micron emitters has been constructed and successfully operated without redundant emitters as described in U.S. patent application Ser. No. 14/743,981, filed Jun. 18, 2015, entitled Micro Assembled LED Displays and Lighting Elements.

In an embodiment, the light elements 60 are separately formed in a semiconductor wafer. The light elements 60 are then removed from the wafer and transferred, for example, using micro transfer printing to the system substrate 12 or pixel module substrate 25. This arrangement has the advantage of using a crystalline semiconductor substrate that provides higher-performance integrated circuit components than can be made in the amorphous or polysilicon semiconductor available on a large substrate such as the system substrate 12.

By employing a multi-step transfer or assembly process, increased yields are achieved and thus reduced costs for the parallel redundant integrated-circuit system 5 of the present invention. Additional details useful in understanding and performing aspects of the present invention are described in U.S. patent application Ser. No. 14/743,981, filed Jun. 18, 2015, entitled Micro Assembled LED Displays and Lighting Elements.

As is understood by those skilled in the art, the terms "over", "under", "above", "below", "beneath", and "on" are relative terms and can be interchanged in reference to different orientations of the layers, elements, and substrates included in the present invention. For example, a first layer on a second layer, in some embodiments means a first layer directly on and in contact with a second layer. In other embodiments, a first layer on a second layer can include another layer there between.

Having described certain embodiments, it will now become apparent to one of skill in the art that other embodiments incorporating the concepts of the disclosure may be used. Therefore, the invention should not be limited to the described embodiments, but rather should be limited only by the spirit and scope of the following claims.

Throughout the description, where apparatus and systems are described as having, including, or comprising specific components, or where processes and methods are described as having, including, or comprising specific steps, it is contemplated that, additionally, there are apparatus, and systems of the disclosed technology that consist essentially of, or consist of, the recited components, and that there are processes and methods according to the disclosed technology that consist essentially of, or consist of, the recited processing steps.

It should be understood that the order of steps or order for performing certain action is immaterial so long as the disclosed technology remains operable. Moreover, two or more steps or actions in some circumstances can be conducted simultaneously. The invention has been described in detail with particular reference to certain embodiments thereof, but it will be understood that variations and modifications can be effected within the spirit and scope of the invention.

PARTS LIST 10 matrix-addressed system/active-matrix system
12 system substrate
16 active area
14 clock
20 pixel
20R pixel
20G pixel
20B pixel
22 full-color pixel module
24 pixel circuit
25 pixel module substrate
26 pixel storage element
28 light element drive circuit
30 column-control circuit
32 column-driver circuit
34 data line
38 column line/column-data line
40 row-select circuit
41 row-select module
42 serial shift register
44 row storage elements
44A row storage elements
44B row storage elements
46 select control line
48 row line/row-select line
48R red row line
48G green row line
48B blue row line
49 row-control circuit
50 system controller
60 light element/light emitter/light sensor/pixel element
60R red light element/red pixel element
60G green light element/green pixel element
60B blue light element/blue pixel element
62 conductor
64 sensor
100 provide system substrate step
110 dispose array of pixels on system substrate step
112 micro-transfer print light elements on pixel module substrate step
114 dispose pixel substrate on system substrate step
116 electrically connect pixel substrate and light elements step
118 dispose pixel module substrate on system substrate
120 provide column-control circuit step
130 dispose row-select circuit on system substrate step
140 electrically connect pixels on system substrate step

What is claimed:

1. An active-matrix system, comprising:
a system substrate having an active area;
pixel elements disposed on, in, over, or under the system substrate, the pixel elements arranged in the active area in a pixel element array having pixel rows and pixel columns, wherein each pixel element in the pixel element array is in one of the pixel rows and one of the pixel columns;
pixel circuits disposed on, in, over, or under the system substrate in the active area in a pixel circuit array having circuit rows and circuit columns, wherein each of the pixel circuits is in one of the circuit rows or one of the circuit columns and is independent of each other of the pixel circuits, each of the pixel circuits is electrically connected to and controls two or more of the pixel elements, and the pixel circuits number less than the pixel elements;
row lines disposed on, in, over, or under the system substrate in the active area, wherein for each of the row lines, the row line is electrically connected to all of the pixel circuits in one of the circuit rows to provide information in common to all of the pixel circuits in the one circuit row, or receive information in common from all of the pixel circuits in the one circuit row, through the row line; and
column lines electrically separate from the row lines disposed on, in, over, or under the system substrate in the active area, wherein for each of the column lines, the column line is electrically connected to all of the pixel circuits in one of the circuit columns to provide information in common to all of the pixel circuits in the one circuit column, or receive information in common from all of the pixel circuits in the one circuit column, through the column line,
wherein (i) the row lines number less than the pixel rows, (ii) the column lines number less than the pixel columns, or (iii) the row lines number less than the pixel rows and the column lines number less than the pixel columns, and
wherein each of the pixel circuits comprises a pixel storage element that stores information in response to signals communicated on the row line and the column line to which the pixel circuit is connected.

2. The active-matrix system of claim 1, wherein the system substrate is a display substrate, the active area is a display area, the pixel elements are one or more of controllable light-reflective pixels, controllable light-absorbing pixels, and controllable light-emitting pixels, and the active-matrix system is an active-matrix display.

3. The active-matrix system of claim 2, wherein each of the pixel elements comprises an inorganic light-emitting diode.

4. The active-matrix system of claim 2, wherein the pixel elements controlled by a common pixel circuit comprise two or more light-controlling elements, each light-controlling element of the two or more light-controlling elements controlling a different color of visible light than each other of the two or more light-controlling elements.

5. The active-matrix system of claim 2, comprising a sensor disposed on, in, over, or under the display substrate and electrically connected to one or more of the pixel circuits.

6. The active-matrix system of claim 1, wherein the system substrate is a sensor substrate, the active area is a sensor area, the pixel elements are light-responsive pixels, and the active-matrix system is an image sensor.

7. The active-matrix system of claim 6, wherein each of the pixel elements comprises a photo-sensor.

8. The active-matrix system of claim 1, wherein each pixel element comprises a broken or separated tether.

9. The active-matrix system of claim 1, wherein the pixel circuits are digital controllers and the pixel storage element of each of the pixel circuits stores digital values corresponding to a value associated with the two or more of the pixel elements controlled by the pixel circuit.

10. The active-matrix system of claim 1, wherein (i) the row lines conduct digital signals, (ii) the column lines conduct digital signals, or (iii) both (i) and (ii).

11. The active-matrix system of claim 1, wherein (i) the row lines conduct analog signals, (ii) the column lines conduct analog signals, or (iii) both (i) and (ii).

12. The active-matrix system of claim 1, comprising (i) row drivers electrically connected to each of the row lines, (ii) column drivers electrically connected to each of the column lines, or (iii) both (i) and (ii).

13. The active-matrix system of claim 1, wherein the two or more of the pixel elements controlled by each pixel circuit are in a common pixel row or are in a common pixel column such that the two or more of the pixel elements form a one-dimensional array of pixel elements.

14. The active-matrix system of claim 1, wherein at least two of the two or more of the pixel elements controlled by each pixel circuit are in different rows and in different columns such that the two or more of the pixel elements form a two-dimensional array of pixel elements.

15. The active-matrix system of claim 1, wherein the row lines conduct pulse-width modulation signals.

16. The active-matrix system of claim 1, comprising pixel module substrates disposed on the system substrate, wherein at least one of the pixel circuits and the two or more of the pixel elements controlled by each of the at least one of the pixel circuits is disposed on each pixel module substrate.

17. The active-matrix system of claim 16, wherein each of the pixel module substrates comprises a broken or separated tether.

18. The active-matrix system of claim 1, wherein each of the pixel elements comprises one or more micro-devices that each have at least one of a width from 2 to no more than 5 µm, 5 to no more than 10 µm, 10 to no more than 20 µm, or 20 to no more than 50 µm, a length from 2 to no more than 5 µm, 5 to no more than 10 µm, 10 to no more than 20 µm, or 20 to no more than 50 µm, and a thickness from 2 to no more than 5 µm, 5 to no more than 10 µm, 10 to no more than 20 µm, or 20 to no more than 50 µm.

19. The active-matrix system of claim 1, wherein each of the pixel circuits comprises one or more micro-devices that each have at least one of a width from 2 to no more than 5 µm, 5 to no more than 10 µm, 10 to no more than 20 µm, or 20 to no more than 50 µm, a length from 2 to no more than 5 µm, 5 to no more than 10 µm, 10 to no more than 20 µm, or 20 to no more than 50 µm, and a thickness from 2 to no more than 5 µm, 5 to no more than 10 µm, 10 to no more than 20 µm, or 20 to no more than 50 µm.

20. The active-matrix system of claim 1, wherein at least a portion of the pixel circuits are disposed between the pixel elements.

21. The active-matrix system of claim 20, wherein, for each of the pixel circuits, the two or more pixel elements are disposed adjacent to at least two sides of the pixel circuit that controls the two or more pixel elements.

* * * * *